US008235781B2

(12) United States Patent
Moody

(10) Patent No.: US 8,235,781 B2
(45) **Date of Patent: *Aug. 7, 2012**

(54) ELECTRONIC VIDEO POKER GAMES

(75) Inventor: Ernest W. Moody, Las Vegas, NV (US)

(73) Assignee: IGT, Reno, NV (US)

( * ) Notice: Subject to any disclaimer, the term of this patent is extended or adjusted under 35 U.S.C. 154(b) by 978 days.

This patent is subject to a terminal disclaimer.

(21) Appl. No.: 12/202,815

(22) Filed: Sep. 2, 2008

(65) Prior Publication Data

US 2009/0005144 A1 Jan. 1, 2009

Related U.S. Application Data

(60) Division of application No. 11/158,787, filed on Jun. 22, 2005, now Pat. No. 7,431,644, which is a continuation of application No. 10/108,845, filed on Mar. 26, 2002, now Pat. No. 6,964,418, which is a continuation of application No. 09/633,479, filed on Aug. 7, 2000, now Pat. No. 6,652,377, which is a continuation-in-part of application No. 09/175,226, filed on Oct. 20, 1998, now Pat. No. 6,098,985, which is a continuation-in-part of application No. 09/083,531, filed on May 22, 1998, now Pat. No. 6,007,066, which is a continuation-in-part of application No. 08/900,965, filed on Jul. 25, 1997, now Pat. No. 5,823,873, which is a continuation-in-part of application No. 08/755,174, filed on Nov. 25, 1996, now Pat. No. 5,732,950.

(60) Provisional application No. 60/019,879, filed on Jun. 17, 1996.

(51) Int. Cl.

| | |
|---|---|
| ***G07F 17/34*** | (2006.01) |
| ***A63F 1/00*** | (2006.01) |
| ***A63F 13/00*** | (2006.01) |

(52) U.S. Cl. ........................ 463/13; 273/292; 273/138.2

(58) Field of Classification Search .................. 273/292, 273/274, 309, 138.2, 143 R; 463/13, 12
See application file for complete search history.

(56) References Cited

U.S. PATENT DOCUMENTS 2,228,180 A 1/1941 Pauli
(Continued)

FOREIGN PATENT DOCUMENTS

GB 2169736 7/1986
(Continued)

OTHER PUBLICATIONS

Decision of the Technical Board of Appeal 3.2.04 dated Oct. 11, 2007 to Appeal No. T 0336/07-3.2.04 received from the European Patent Office.

(Continued)

*Primary Examiner* — Benjamin Layno
(74) *Attorney, Agent, or Firm* — Neal, Gerber & Eisenberg LLP

(57) ABSTRACT

A video poker machine configured to allow a player to play a card game is provided. The video poker machine includes at least one display device, at least one input device, and at least one computer configured to display at least a first hand and a second hand of at least five cards all face up, each hand including the same five cards. A player can be provided an option to play a hand by selecting none, one or more than one of the face up cards from the first hand and the second hand and any additional hands as cards to be held. Each of the cards not selected to be held are discarded from each hand and replaced with a face up card. The player can be provided a pre-established amount based on the amount of a wager made on the hand if the resulting cards of the hand comprise a predetermined poker hand ranking.

24 Claims, 18 Drawing Sheets

U.S. PATENT DOCUMENTS

| | | | |
|---|---|---|---|
| 2,474,573 | A | 6/1949 | Cohen |
| 3,589,729 | A | 6/1971 | Girard |
| 4,648,604 | A | 3/1987 | Horan |
| 4,743,022 | A | 5/1988 | Wood |
| 4,861,041 | A | 8/1989 | Jones et al. |
| 4,948,134 | A | 8/1990 | Suttle et al. |
| 5,022,653 | A | 6/1991 | Suttle et al. |
| 5,042,818 | A | 8/1991 | Weingardt |
| 5,100,137 | A | 3/1992 | Fulton |
| 5,118,109 | A | 6/1992 | Gumina |
| 5,154,429 | A | 10/1992 | LeVasseur |
| 5,165,693 | A | 11/1992 | Handlon, Sr. |
| 5,167,413 | A | 12/1992 | Fulton |
| 5,255,915 | A | 10/1993 | Miller |
| 5,265,882 | A | 11/1993 | Malek |
| 5,280,915 | A | 1/1994 | Grossman |
| 5,288,081 | A | 2/1994 | Breeding |
| 5,294,120 | A | 3/1994 | Schultz |
| 5,303,929 | A | 4/1994 | Sandeen |
| 5,308,065 | A | 5/1994 | Bridgeman et al. |
| 5,320,356 | A | 6/1994 | Cauda |
| 5,328,189 | A | 7/1994 | Malek |
| 5,332,219 | A | 7/1994 | Marnell et al. |
| 5,356,140 | A | 10/1994 | Dabrowski et al. |
| 5,377,993 | A | 1/1995 | Josephs |
| 5,382,025 | A | 1/1995 | Slansky et al. |
| 5,417,430 | A | 5/1995 | Breeding |
| 5,452,899 | A | 9/1995 | Skratulia et al. |
| 5,486,005 | A | 1/1996 | Neal |
| 5,531,441 | A | 7/1996 | Dabrowski et al. |
| 5,531,448 | A | 7/1996 | Moody |
| 5,542,669 | A | 8/1996 | Charron et al. |
| 5,544,892 | A | 8/1996 | Breeding |
| 5,573,249 | A | 11/1996 | Johnson |
| 5,577,731 | A | 11/1996 | Jones |
| 5,580,053 | A | 12/1996 | Crouch |
| 5,630,753 | A | 5/1997 | Fuchs |
| 5,639,092 | A | 6/1997 | Macaisa |
| 5,664,781 | A | 9/1997 | Feola |
| 5,722,891 | A | 3/1998 | Inoue |
| 5,725,428 | A | 3/1998 | Achmuller |
| 5,732,950 | A | 3/1998 | Moody |
| 5,743,530 | A | 4/1998 | Sklad et al. |
| 5,813,911 | A | 9/1998 | Margolin |
| 5,816,915 | A | 10/1998 | Kadlic |
| 5,823,873 | A | 10/1998 | Moody |
| 5,868,618 | A | 2/1999 | Netley et al. |
| 5,879,233 | A | 3/1999 | Stupero |
| 5,909,875 | A | 6/1999 | Weingardt |
| 5,934,675 | A | 8/1999 | Handelman et al. |
| 5,954,335 | A | 9/1999 | Moody |
| 5,976,016 | A | 11/1999 | Moody et al. |
| 6,007,066 | A | 12/1999 | Moody |
| 6,045,129 | A | 4/2000 | Cooper et al. |
| 6,050,568 | A | 4/2000 | Hachquet |
| 6,079,710 | A | 6/2000 | Brown |
| 6,098,985 | A | 8/2000 | Moody |
| 6,102,400 | A | 8/2000 | Scott et al. |
| 6,120,378 | A | 9/2000 | Moody |
| 6,135,882 | A | 10/2000 | Kadlic |
| 6,135,883 | A | 10/2000 | Hachquet |
| 6,149,156 | A | 11/2000 | Feola |
| 6,159,095 | A | 12/2000 | Frohm et al. |
| 6,168,521 | B1 | 1/2001 | Luciano et al. |
| 6,176,781 | B1 | 1/2001 | Walker et al. |
| 6,311,978 | B1 | 11/2001 | Moody |
| 6,334,613 | B1 | 1/2002 | Yoseloff |
| 6,419,578 | B1 | 7/2002 | Moody et al. |
| 6,517,074 | B1 | 2/2003 | Moody |
| 6,537,150 | B1 | 3/2003 | Luciano et al. |
| 6,561,898 | B2 | 5/2003 | Moody |
| 6,568,680 | B1 | 5/2003 | Moody et al. |
| 6,652,377 | B1 | 11/2003 | Moody |
| 6,672,959 | B2 | 1/2004 | Moody et al. |
| 6,955,356 | B2 | 10/2005 | Moody |
| 6,964,418 | B2 | 11/2005 | Moody |

FOREIGN PATENT DOCUMENTS

| | | |
|---|---|---|
| WO | 97/13562 | 4/1997 |

OTHER PUBLICATIONS

Morehead et al., "Description of Poker,"; "Description of Hold'em Poker," Hoyle's Rules of Games, Second Revised Edition, pp. 34-63 and pp. 47-48 (1983).

Morehead et al., "Description of Poker,"; "Description of Hold'em Poker," Official Rules of Card Games, 53rd Edition, pp. 64-97 and pp. 78-79 (1963).

Decision of the Examining Division of the European Patent Office posted Oct. 21, 2005 refusing European patent application No. 98113910.8 pursuant to Article 97(1) EPC, Case No. T 1023-06-3. 2.04, issued by the Technical Board of Appeal 3.2.04 on Dec. 7, 2006.

Preliminary, non-binding observations of the Munich branch of the European Patent Office for European patent application No. 03029415.1, Case No. T 0336-07-3.2.04, issued on May 11, 2007.

"Double Handed High-Low", Hoyle's Modern Encyclopedia of Card Games, Walter B. Gibson, Doubleday & Company, Inc., p. 248 and pp. 228-234, 1974.

Scarne's New Complete Guide to Gambling, John Scarne, pp. 490-499, copyright 1994.

Statement of Grounds and Particulars filed in Support of Notice of Opposition, Australian Application No. 2005209651, dated Apr. 6, 2009.

ELECTRONIC VIDEO POKER GAMES

PRIORITY CLAIM

This application is a divisional of, claims priority to and the benefit of application Ser. No. 11/158,787, entitled "Electronic Video Poker. Games," filed Jun. 22, 2005, now pending; which is a Continuation of application Ser. No. 10/108,845, entitled "Electronic Video Poker Games," filed Mar. 26, 2002, now U.S. Pat. No. 6,964,418; which is a Continuation of application Ser. No. 09/633,479, entitled "Electronic Video Slot and Poker Games," filed Aug. 7, 2000, now U.S. Pat. No. 6,652,377; which is a Continuation-in-Part of application Ser. No. 09/175,226, entitled "Electronic Video Poker Games," filed Oct. 20, 1998, now U.S. Pat. No. 6,098,985; which is a Continuation-in-Part of application Ser. No. 09/083,531, entitled "Electronic Video Poker Games," filed May 22, 1998, now U.S. Pat. No. 6,007,066; which is a Continuation-in-Part of application Ser. No. 08/900,965, entitled "Method of Playing Electronic Video Poker Games," filed Jul. 25, 1997, now U.S. Pat. No. 5,823,873; which is a Continuation-in-Part of application Ser. No. 08/755,174, entitled "Electronic Video Poker Games," filed Nov. 25, 1996, now U.S. Pat. No. 5,732,950; which claimed priority from provisional application Ser. No. 60/019,879, entitled "Electronic Video Poker Games," filed Jun. 17, 1996, the entire contents of which are incorporated herein, with each of these earlier applications being commonly owned with this application.

BACKGROUND

This invention relates primarily to electronic video poker games, and more particularly to electronic video poker games that are based on poker hand rankings and that allow the player to discard and replace unwanted cards with replacement cards. The present invention has many versions with the common thread being that cards are duplicated from an initial hand of cards into one or more additional hands to allow the player the opportunity to play one or more cards from the starting hand of cards multiple times. The invention also involves features which may apply to casino table games as well.

SUMMARY

The method of the present invention involves a card game in which the player plays multiple hands of cards. The player makes a wager for each row of cards and each row of cards becomes a separate hand to be played by the player. One hand of two, three, four or five cards are dealt all face up. The player selects none, one or more of the face up cards from the first hand as cards to be held. The cards that are held are duplicated from the first hand into all of the other hands. Replacement cards for the non-selected cards are dealt into the first hand and additional cards are then dealt to the first hand, if needed, so that the first hand has five cards. Additional cards are also dealt to all of the other hands so that each hand is a five card hand. The poker hand ranking of each five card hand is determined row by row. The player is then paid for any winning poker hands based on a pay table and the amount of the player's wager Alternatively, the method of the present invention can also be applied to three card poker or four card poker.

Additional features and advantages are described herein, and will be apparent from the following Detailed Description and the figures.

DETAILED DESCRIPTION

The present invention includes a variety of electronic video poker games each having multiple hands in which the player selects zero, one or more cards from a first hand and the selected cards are duplicated into each of the other hands. Each of the hands receives additional cards so that each hand is a complete poker hand. Each electronic video poker game is designed to be played by having the hands displayed on a video screen to a player. By manipulating the buttons on the button panel of the gaming device or by using conventional touch screen technology, the player selects which cards he wishes to play, which cards he wishes to duplicate into other hands and which cards he wishes to discard. The player activates a draw button and replacement cards are then displayed for the discarded cards. The resulting competed hands are analyzed for poker hand ranking and the outcome of the play of each hand is determined. The player wins awards based on the poker hand rankings of the completed hands and the amount wagered by the player on each hand using a pay table that is displayed to the player.

Version #A

Figure 1:
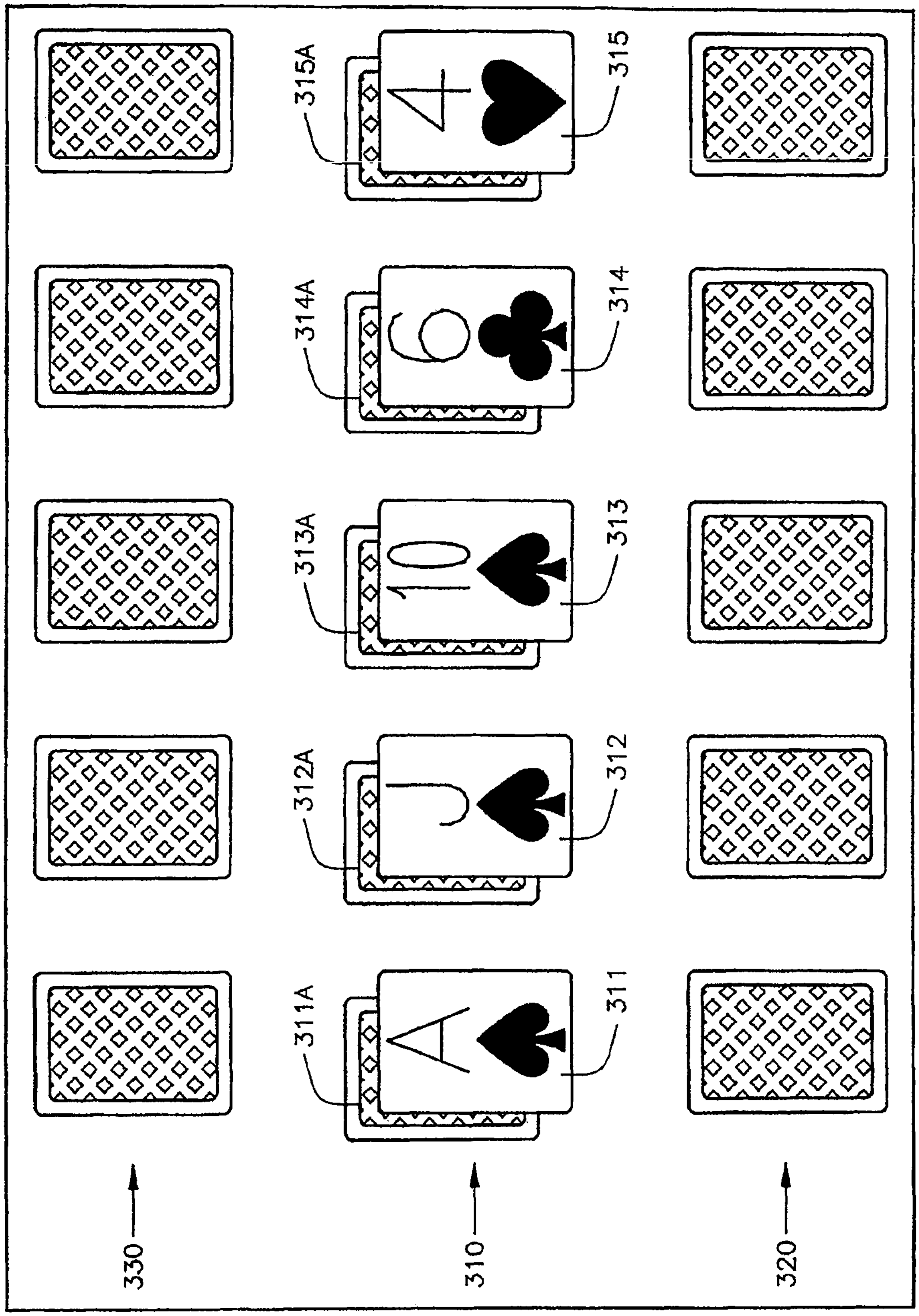
FIG. 1 shows the screen display for Version #A of the present invention after the initial deal of the cards.

FIG. 1 shows the layout for the initial deal of one version of the present invention. Three rows of cards are initially dealt. The center row 310 is dealt face up; the bottom row 320 and the top row 330 are dealt face down. Also, a face down card 311A, 312A, 313A, 314A and 315A is dealt underneath each of the respective face up cards 311, 312, 313, 314 and 315 in the center row 310.

The player makes one, two or three wagers: the first wager is on row 310, the second wager is on row 320 and the third wager is on row 330. Thus, the player is playing one, two or three hands at a time.

The player selects those cards in the center row 310 that he wishes to hold. The player effects this selection by pressing buttons or, using touch screen technology, by simply pressing the cards on the screen that the player wishes to hold. Each card that is held by the player from the center row 310 is duplicated in the corresponding vertically aligned position in both the bottom row 320 and the top row 330. Therefore, three copies of the held card are now displayed on the screen. The player may hold from zero to five cards from the center row 310.

Figure 2:
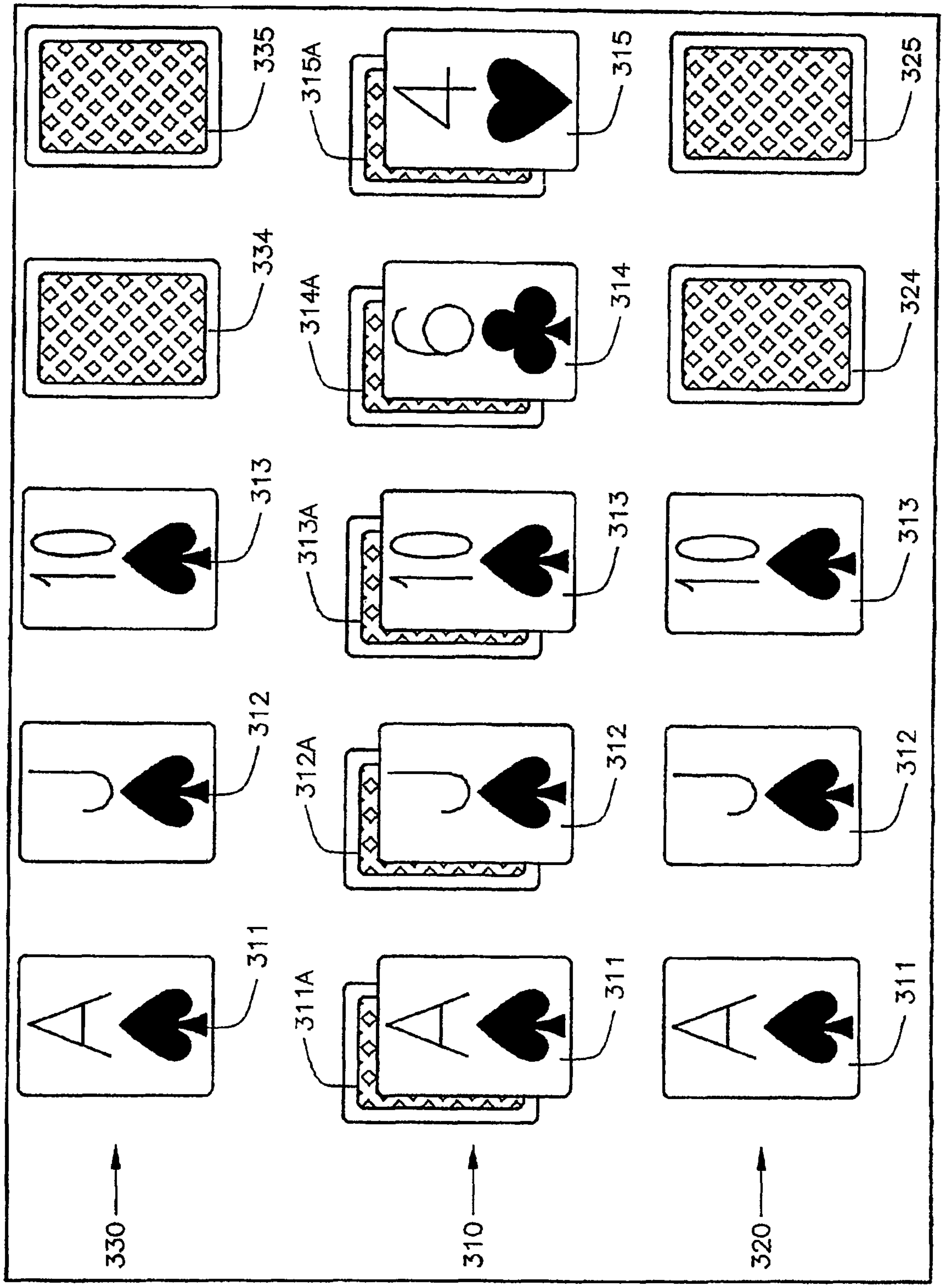
FIG. 2 shows the screen display for Version #A after the player has selected the cards he wishes to hold from the center row.

FIG. 2 shows an example of the play of the hand when the player has held card 311, card 312 and card 313 from the center row 310. Card 311, the Ace of Spades, is duplicated in the same aligned position in top row 330 and in bottom row 320. Likewise, card 312, the Jack of Spades, and card 313, the Ten of Spades, are both duplicated in the same aligned positions in top row 330 and bottom row 320.

After the player is satisfied with his selection of replacement cards, the player presses the "deal" button and the two face down cards 324 and 325 in bottom row 320 are revealed. Similarly, the two face down cards 334 and 335 in top row 330 are revealed. The two unheld cards 314 and 315 in the center row 310 are replaced with the face down cards underneath them, cards 314A and 315A, and these two cards 314A and 315A are also revealed.

Each row is treated as a separate hand for payout purposes. Each row is evaluated for poker hand ranking and the player is paid based on the amount of his wager on each row depending on the poker hand ranking achieved for that row.

Thus, the player has effectively played three hands at once. The player could win on all three hands, could lose on all three hands, could win on two hands and lose on one hand or could lose on two hands and win on one hand.

In one of the preferred embodiments of this invention, the method of play uses a separate decks of cards for each hand (or row) of cards that the player wishes to play. For example, in a game in which the player is playing three hands or rows—the first hand is dealt using a first standard fifty-two card deck while the second hand is dealt using a second deck of forty-seven cards which comprises a standard fifty-two card deck having the player's five initial face up cards shown in the first hand omitted therefrom and the third hand is dealt using a third deck of forty-seven cards which comprises a standard fifty-two card deck having the player's five initial face up cards shown in the first hand omitted therefrom. This would allow the player, for example, to theoretically make three Royal Flushes at the same time in each of the three separate hands. This is accomplished using the computer controls that operate the gaming machine with the software being written so that the second and third decks used to deal the second and third hands, respectively, have removed therefrom the five cards initially dealt.

In each of the preferred embodiments of the present invention, a standard fifty-two card deck of playing cards is used for each deck. One or more cards may also be designated as wild cards and, alternatively, one or more Jokers may be added to the deck of cards and the Jokers are used as wild cards.

In each of the preferred embodiments of the present invention, the amount of the player's wager on each hand would be the same. Alternatively, the player could be allowed to make wagers of different amounts on each hand.

Version #B

Figure 3:
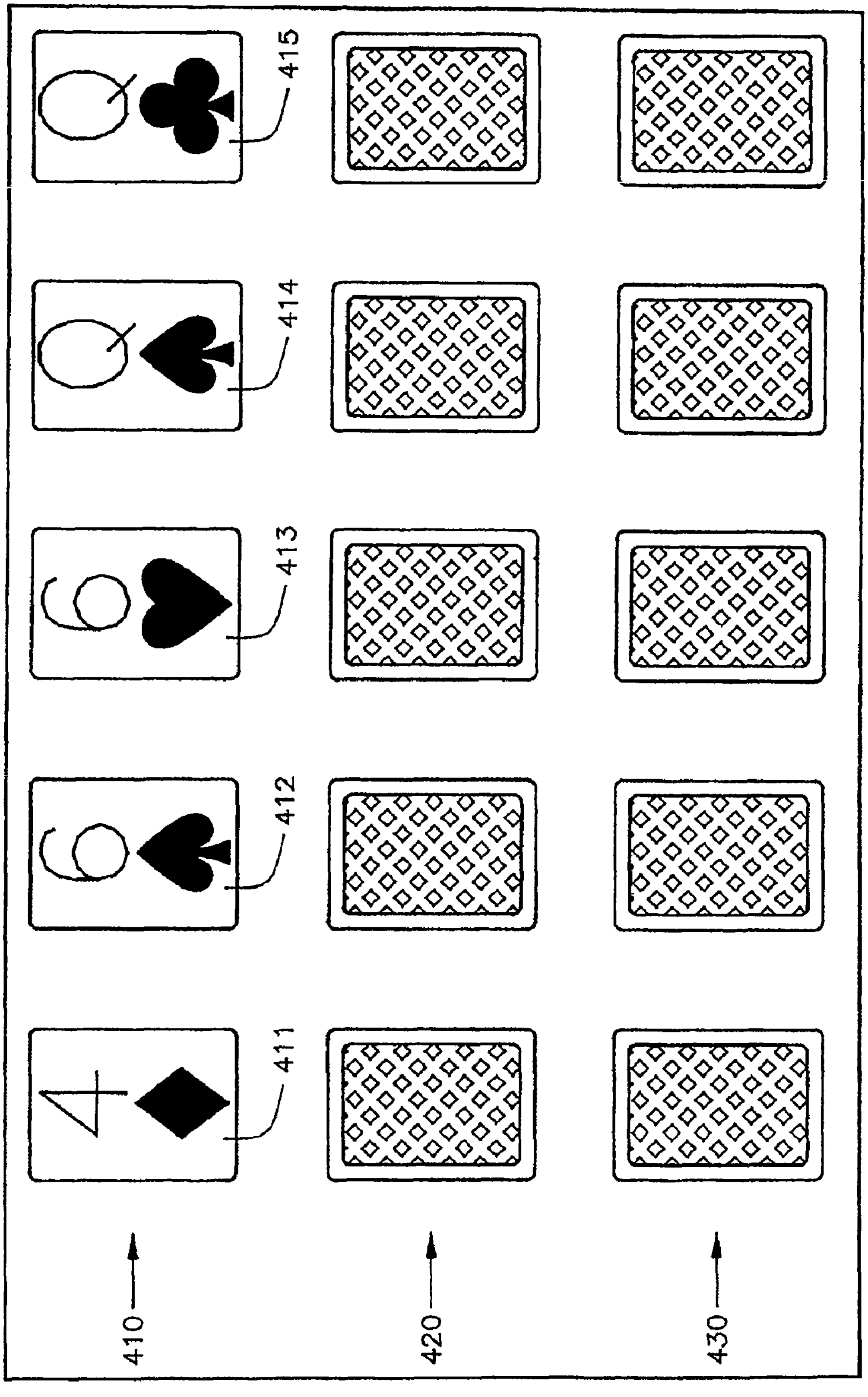
FIG. 3 shows the screen display for Version #B of the present invention after the initial deal of the cards.

This version is played similarly to Version #A in that the player can play three hands at once, except for a modification to the manner in which the cards are dealt to the display screen. FIG. 3 shows the layout for the initial deal of this version. Three rows of cards are initially dealt representing the player's three hands. The top row 410 is dealt face up; the center row 420 and the bottom row 430 are dealt face down. Alternatively, any one of the three rows can be the face up cards with the other two rows being the face down cards.

In one embodiment of the present invention, the player has the option to make one, two or three wagers: the first wager is on row 410, the second wager is on row 420 and the third wager is on row 430. Thus, the player is playing one, two or three hands at a time. Alternatively, it could be mandatory that the player must wager on all three hands.

As shown in FIG. 3, the cards dealt to the top row 410 are the Four of Diamonds 411, the Six of Spades 412, the Six of Hearts 413, the Queen of Spades 414 and the Queen of Clubs 415.

The player selects those cards in the top row 410 that he wishes to hold. The player effects this selection by pressing buttons or, using touch screen technology, by simply pressing the cards on the screen that the player wishes to hold. Each card that is held by the player from the top row 410 is duplicated in the corresponding vertically aligned position in both the center row 420 and the bottom row 430. Therefore, three copies of each of the held cards are now displayed on the screen. The player may hold from zero to five cards from the top row 410.

Figure 4:
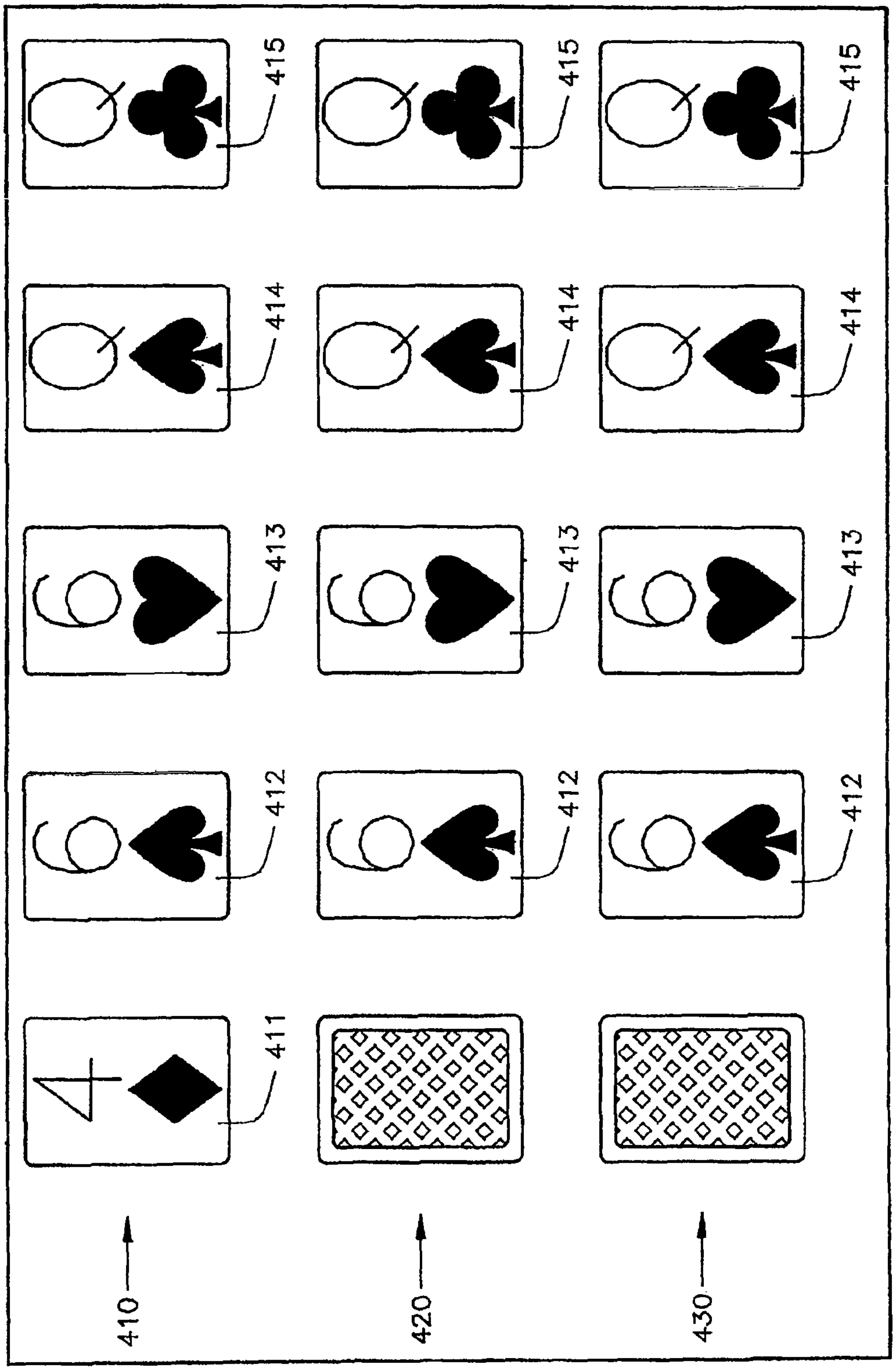
FIG. 4 shows the screen display for Version #B after the player has selected the cards he wishes to hold from the top row and a replacement card has been dealt to the top row.

FIG. 4 shows an example of the play of the hand when the player has held card 412, card 413, card 414 and card 415 from the top row 410. Card 412, the Six of Spades, is duplicated in the same aligned position in center row 420 and in bottom row 430. Likewise, card 413, the Six of Hearts; card 414, the Queen of Spades; and card 415, the Queen of Clubs are also duplicated in the same aligned positions in center row 420 and bottom row 430.

Figure 5:
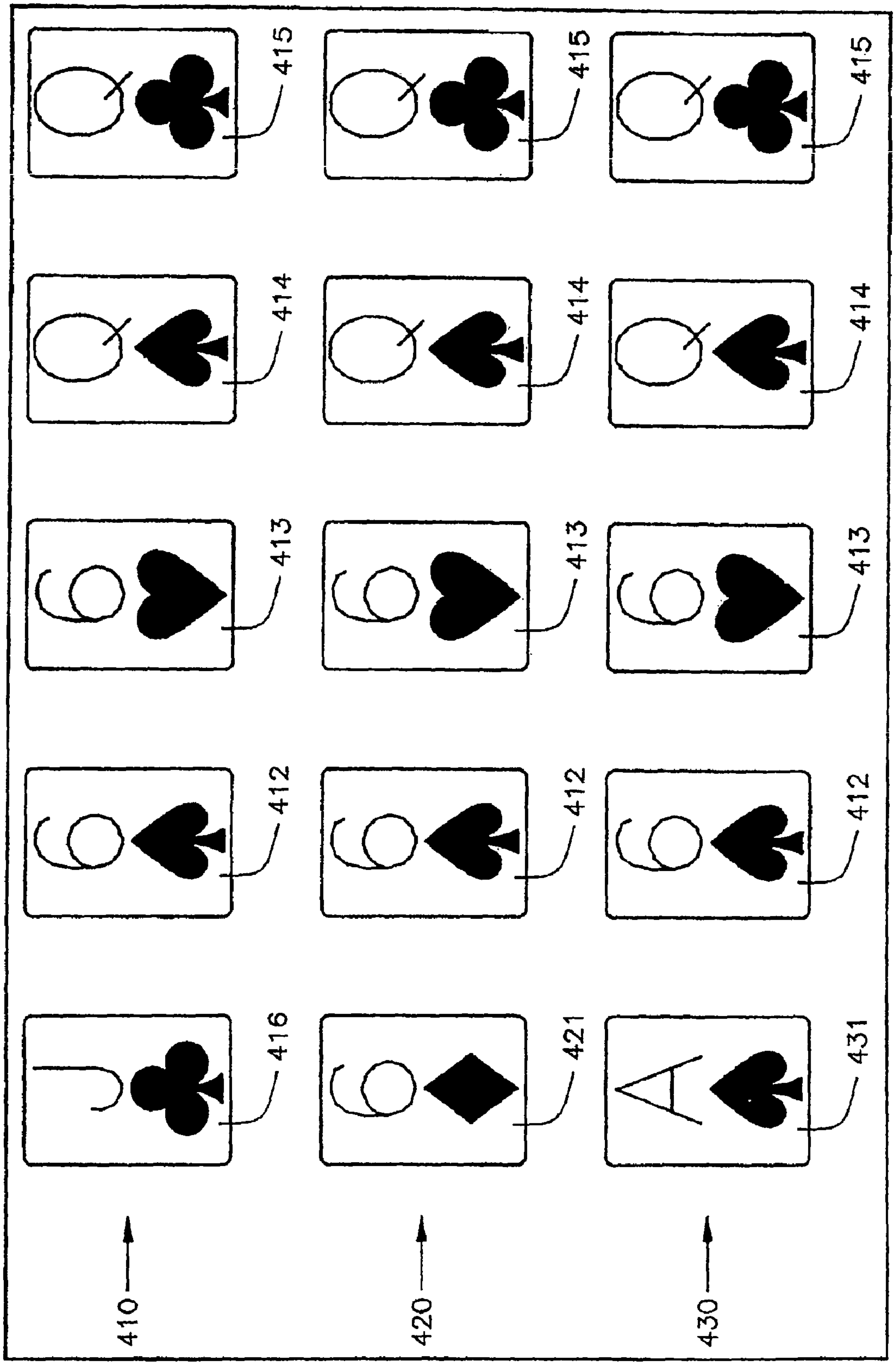
FIG. 5 shows the screen display for Version #B after all three row have been completed and show five card hands.

After the player is satisfied with his selection of the held cards for each of the three hands, the player presses the "draw" button, the cards to be discarded are removed from the screen display and replacement cards are dealt for the discarded cards to complete each of the three hands. With regard to the hand in the top row 410, a replacement card is dealt for card 411 which was discarded by the player. As shown in FIG. 5, the new card is the Jack of Clubs 416 which does not improve the player's hand in the top row 410 which has a final hand ranking of Two Pair.

With regard to the hand in the center row 420, the last card 421 added to this hand is the Six of Diamonds giving the hand in the center row 420 a final hand ranking of a Full House. With regard to the hand in the bottom row 430, the last card

431 added to this hand is the Ace of Spades giving the hand in the bottom row a final hand ranking of Two Pair.

Each row is treated as a separate hand for payout purposes. Each row is evaluated for poker hand ranking and the player is paid based on the amount of his wager on each row depending on the poker hand ranking achieved for that row. A suitable pay table is provided as is conventional for electronic video poker games with the amount of the player's winnings being based on the poker hand ranking achieved and the amount wagered by the player on each hand.

Thus, the player has effectively played three hands at once. The player could win on all three hands, could lose on all three hands, could win on two hands and lose on one hand or could lose on two hands and win on one hand.

Another alternative to Version #B would be to reduce the three rows shown to only two rows and otherwise practice the method of this version as described. The player would make two wagers to play the two rows and select the cards initially dealt that would be used in each of the two rows. Replacement cards would be provided to complete the hands in each of the two rows and winning and losing hands would be determined in the same manner as described above with reference to the three rows.

Likewise, the method of play described in Version #B could also be modified by increasing the number of rows to four or more, with five rows being the preferred number of rows for this alternative embodiment. Again if four or more rows are used, the method of play would be the same as that described above with reference to the three rows version. In order to show four or more rows of cards at the same time on a video screen display, a larger video monitor may be required.

Figure 6:
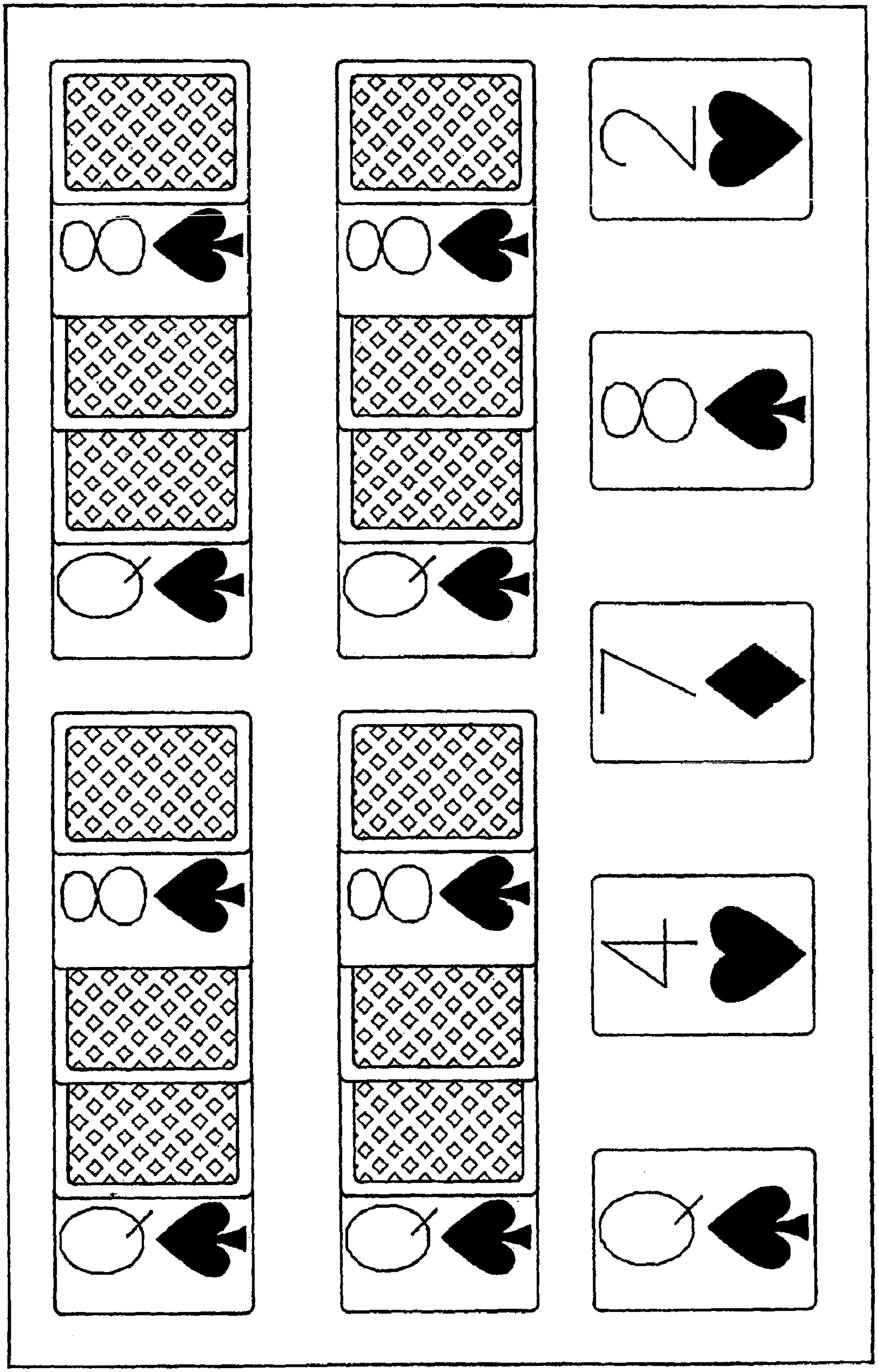
FIG. 6 shows the screen display for a variation of Version #B which uses five rows of cards after the initial deal of the cards.

For example, FIG. 6 shows a screen display with five rows. The player makes appropriate wagers on one or more rows. The lowermost row is displayed first with all five cards face up. The player selects which cards he wishes to hold from the lowermost row and these cards are duplicated into all of the other rows on which the player has wagered. Replacement cards are dealt for the unselected cards in the lowermost row and additional cards are provided to complete each five card hand in the other rows.

However, the preferred embodiment of this version uses five separate decks of cards—the first row being dealt using a first standard fifty-two card deck while the second, third, fourth and fifth rows are dealt using separate decks of forty-seven cards which comprises a standard fifty-two card deck having the player's five initial face up cards shown in the first row omitted therefrom. This would allow the player, for example, to theoretically make five Royal Flushes (or any other five card hands of the same rank) at the same time.

Figure 7:
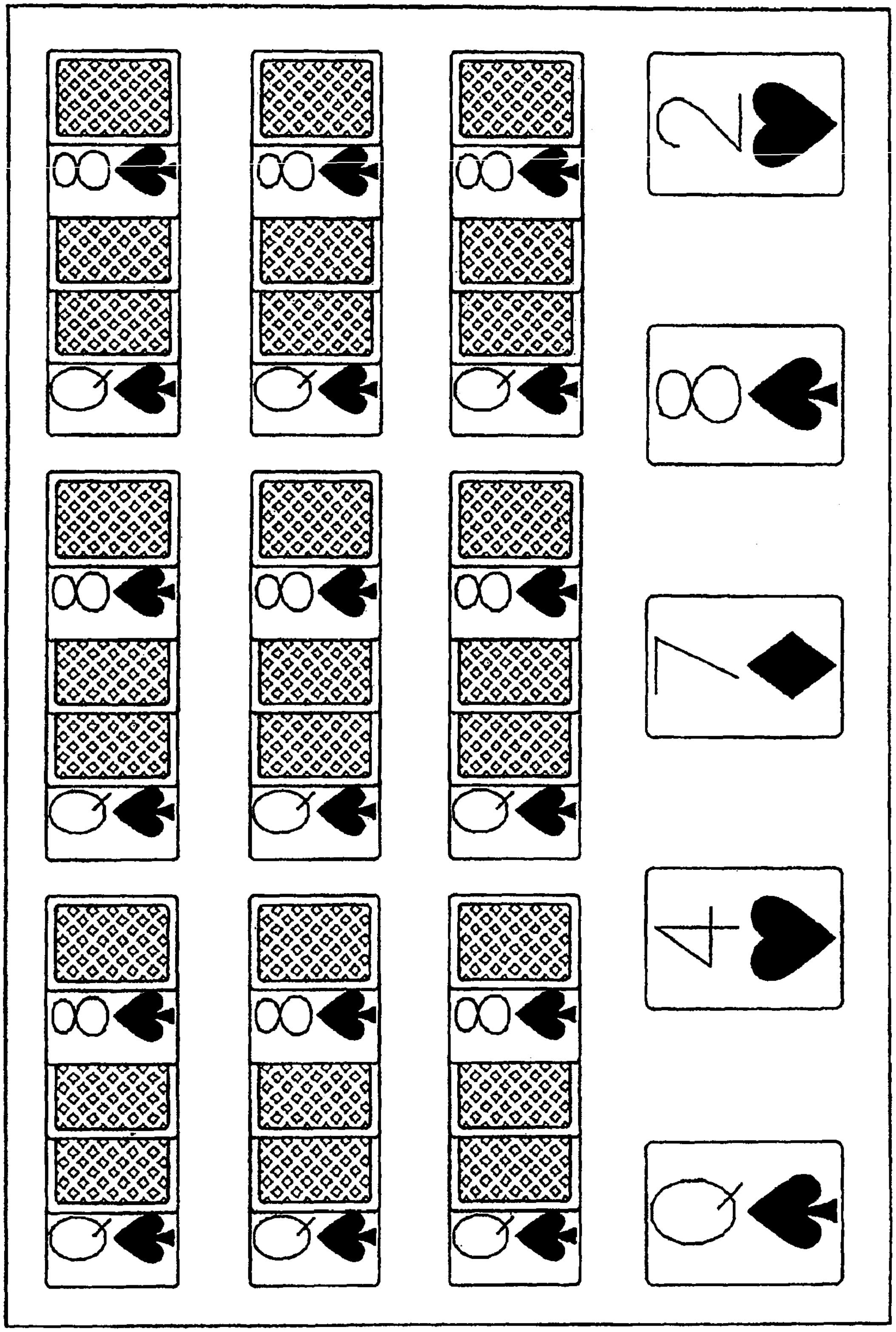
FIG. 7 shows the screen display for another variation of Version #B which uses ten rows of cards after the initial deal of the cards.

FIG. 7 shows another initial row display in which ten rows of cards are displayed to the player. The player makes appropriate wagers on one or more rows up to a total of ten rows to play all ten rows. Again, the lowermost row is displayed first with all five cards face up. The player selects which cards he wishes to hold from the lowermost row and these cards are duplicated into all of the other rows on which the player has wagered. Replacement cards are dealt for the unselected cards in the lowermost row and additional cards are provided to complete each five card hand in the other rows. In one embodiment of this ten row version, a single deck of cards can be used for all of the rows.

However, the preferred embodiment of this version uses ten separate decks of cards—the first row being dealt using a first standard fifty-two card deck while the second through tenth rows are dealt using separate decks of forty-seven cards which comprises a standard fifty-two card deck having the player's five initial face up cards shown in the first row omitted therefrom. This would allow the player, for example, to theoretically make ten Royal Flushes (or any other five card hands of the same rank) at the same time.

Figure 8:
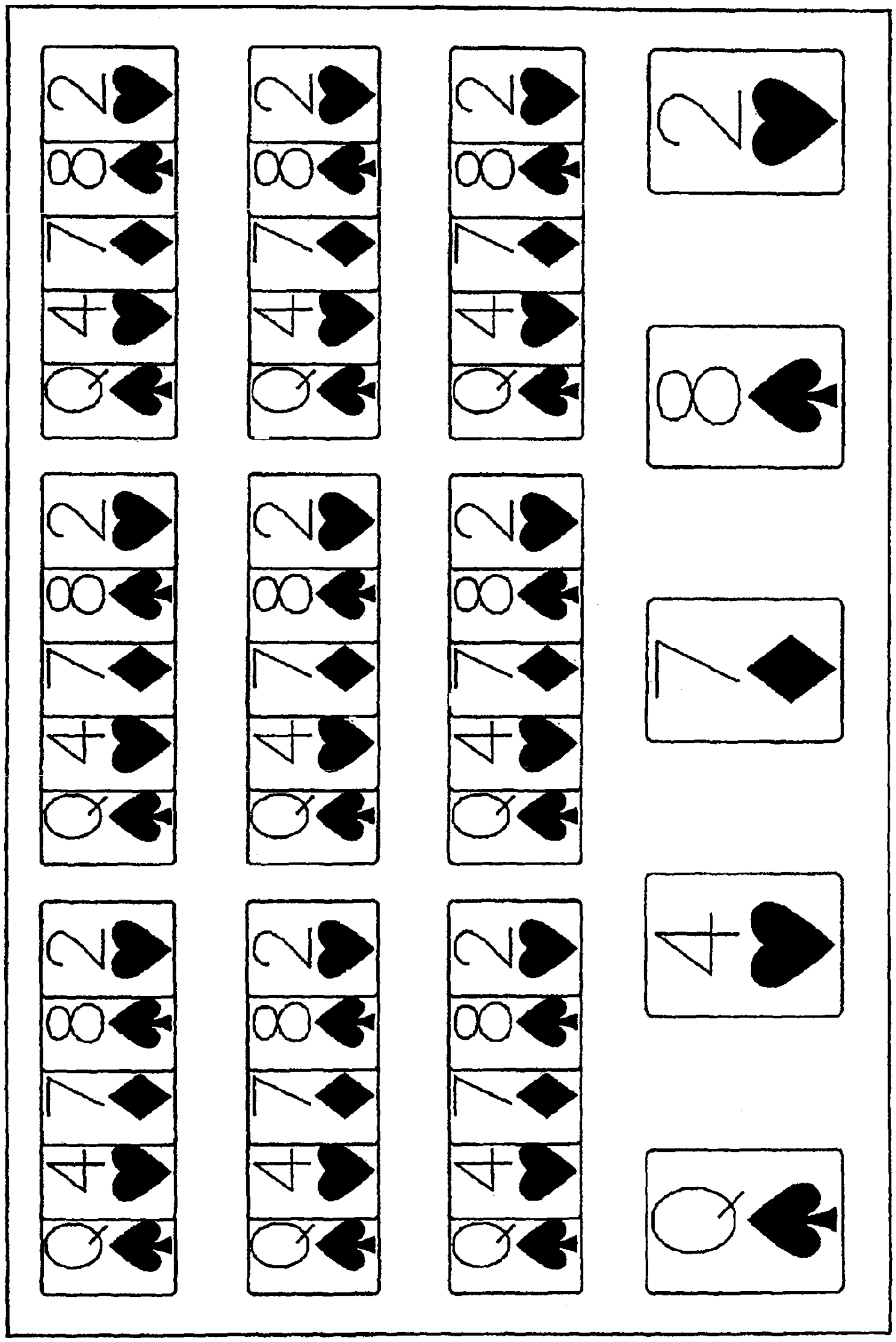
FIG. 8 shows the screen display for still another variation of Version #B which uses ten rows of cards after the initial deal of cards in which all of the rows have the same cards displayed face up.

FIG. 8 shows a different way of displaying the ten rows. When the initial lowermost row is dealt, all five of the face up cards from this initial row are also displayed in the other nine rows. The player selects which cards he wishes to hold from the lowermost row and these cards are automatically held in all of the other rows on which the player has wagered. Replacement cards are dealt for the unselected cards in the lowermost row and all of the other rows. The game otherwise proceeds as described in connection with FIG. 18. Either a single deck of cards or ten separate decks of cards are used. This modified method of displaying the cards dealt in each row can also be applied to the other embodiments of the present invention.

In order to adopt any of the various embodiments of the present invention to the smaller video monitors often used in video poker gaming machines, the display of the play of the method of play can be modified. This modified display method can be a seriatim method in which the player plays a plurality of hands one after another. In this seriatim method, the player would initially make a multiple coin, token or credit wager representing the number of hands that the player wishes to play during that round of the game. The minimum number of coins or credits wagered would be two representing two hands that the player wishes to play with the maximum being any number desired. The player can also wager multiple coins per each hand.

After the player has decided on the number of hands and the number of coins to be wagered on each hand, the first hand of five cards would initially be dealt to the player. The player would select which of the initial five cards, if any, the player wishes to hold and then replacement cards would be dealt for the discarded cards. The winning or losing outcome of this first hand would then be determined. The results of this first hand can be displayed in a portion such as the corner of the video display screen as a smaller hand display similar in size to the smaller hands shown in FIG. 8.

For the second hand, the cards held by the player from the first hand would then be redisplayed on the video screen and additional cards would be dealt to complete the player's second hand. Again, the winning or losing outcome of this second hand would be determined. The steps of redisplaying the held cards from the first hand and the dealing of cards to complete the hand would be repeated for each wager made by the player until the total number of hands originally wagered by the player is completed. After each hand is played, the results of each hand can be displayed in a portion such as the corner of the video display screen as a smaller hand display similar in size to the smaller hands shown in FIG. 8. This seriatim method of play can be applied whenever two or more rows are desired to be played.

In this seriatim alternative method of play, each hand is completed by using a separate deck of cards (which have the first five cards removed therefrom so as to eliminate the possibility of duplicated cards being dealt as replacement cards) or by reshuffling the remaining forty-seven cards before each new row is played. Alternatively, a single deck of cards can be used as the source for both the initial five cards and the additional cards used to complete each of the multiple hands.

Version #C

Another alternative method of play of the present invention would have two or more rows of five or more cards all dealt face up with each row having the same cards shown face up.

Figure 9:
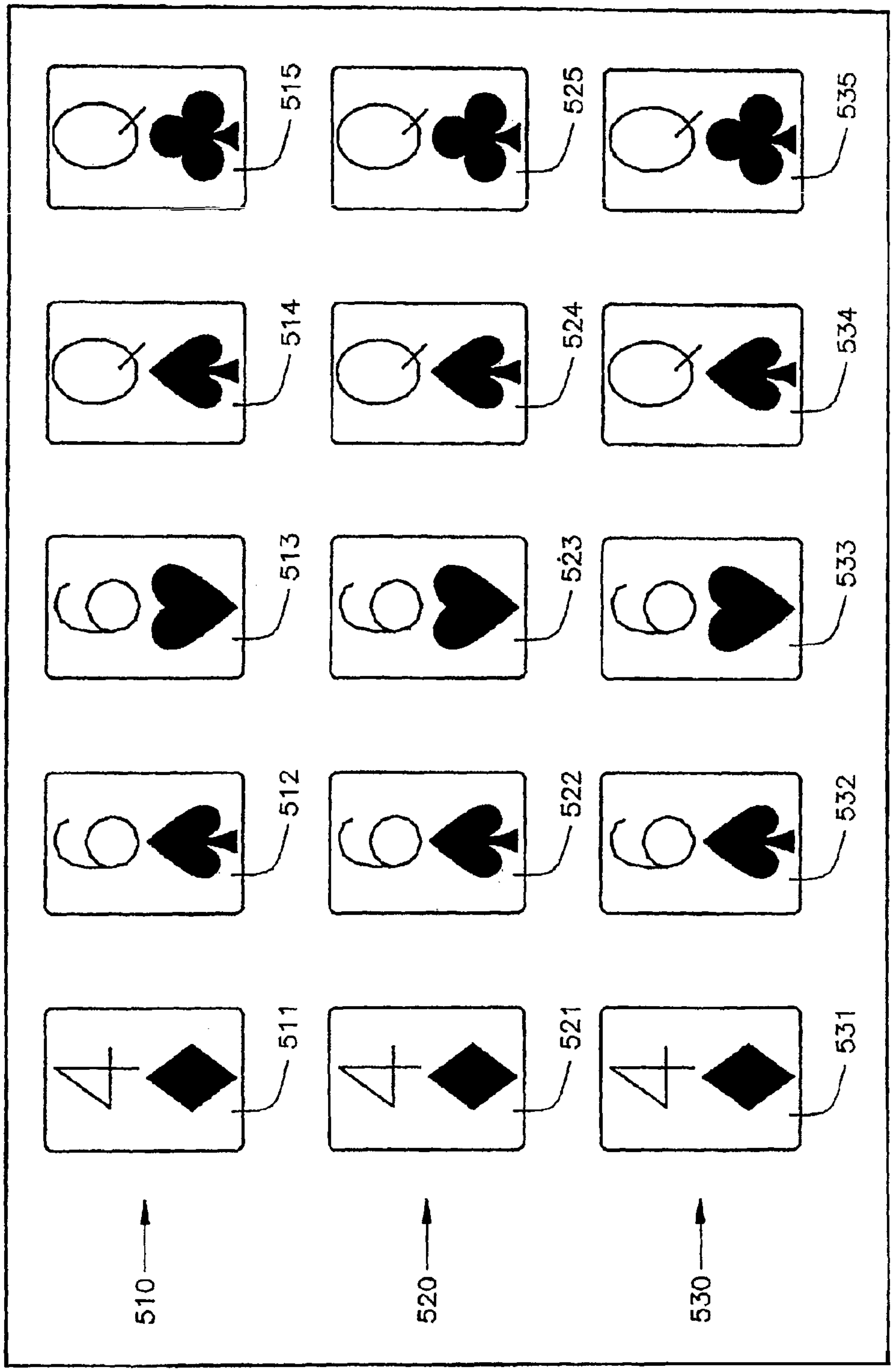
FIG. 9 shows the screen display for Version #C of the present invention after the initial deal of the cards.

In the preferred embodiment of this version #C, three rows are displayed face up with each row having the same five cards shown in each hand. As shown in the example in FIG. 9, row 510 is dealt with five cards—the Four of Diamonds 511, the Six of Spades 512, the Six of Hearts 513, the Queen of Spades 514 and the Queen of Clubs 515; row 520 is dealt with five cards—the Four of Diamonds 521, the Six of Spades 522, the Six of Hearts 523, the Queen of Spades 524 and the Queen of Clubs 525; and row 530 is dealt with five cards—the Four of Diamonds 531, the Six of Spades 532, the Six of Hearts 533, the Queen of Spades 534 and the Queen of Clubs 535. The player can then select which cards to hold from any one of the rows and these cards selected by the player are automatically held in the other two rows. Again with reference to the example shown in FIG. 9, the player would most likely hold the Six of Spades, the Six of Hearts, the Queen of Spades and the Queen of Clubs. Whichever cards are selected by the player will automatically be held in each of the rows.

Each row then receives replacement cards for the cards that are discarded, preferably from separate decks for each row. The player has three final five card hands and wins or loses on each hand separately based on a pay table which shows the winning hand combinations. If the player has a winning hand, the amount won by the player is based on the amount wagered by the player on that particular row and the poker hand ranking of the cards in that row. This Version #C may also be applied to methods of play that use only two rows or that use four or more rows.

Version #D

Figure 10:
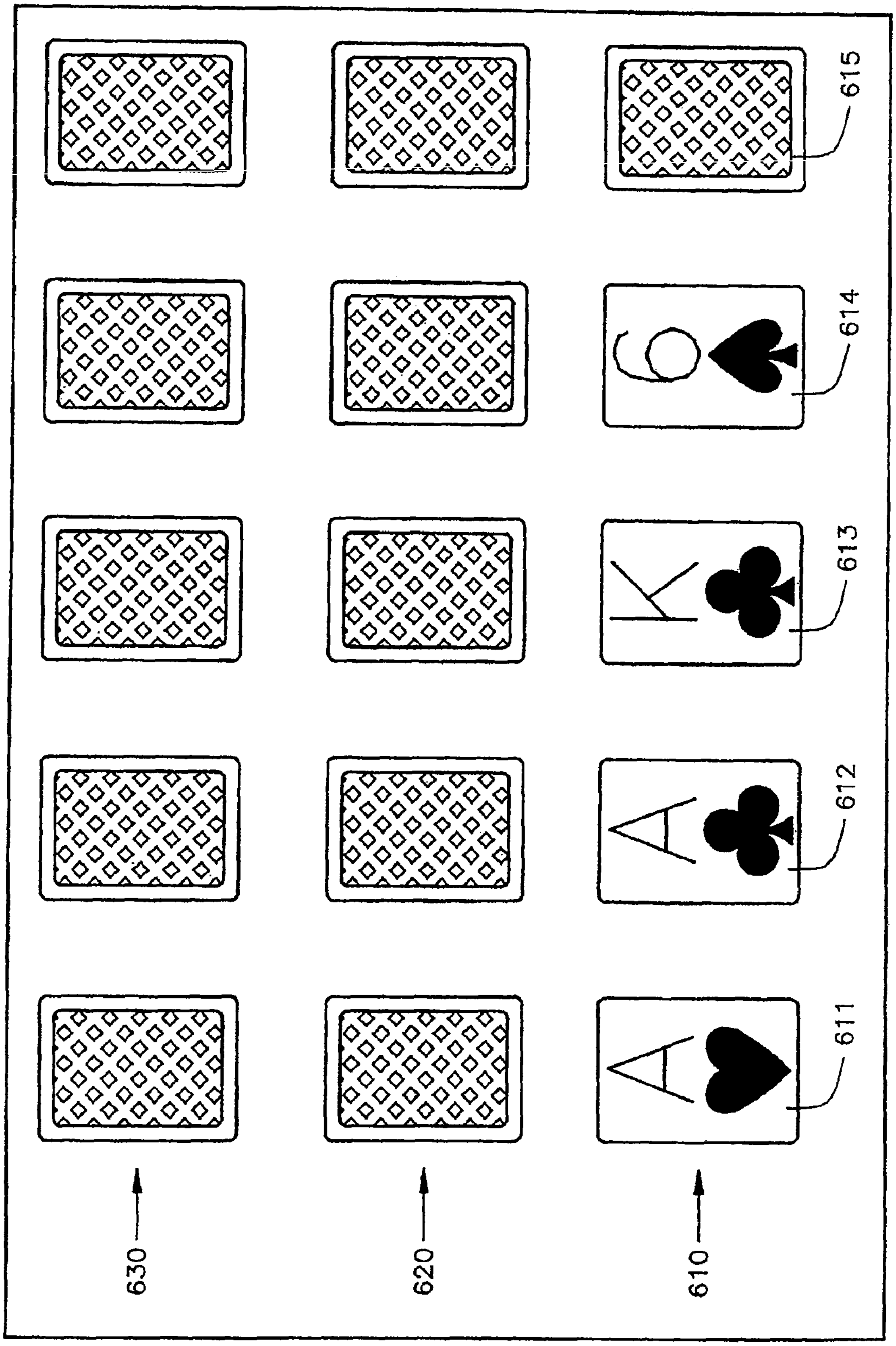
FIG. 10 shows the screen display for Version #D of the present invention after the initial deal of the cards.
Figure 11:
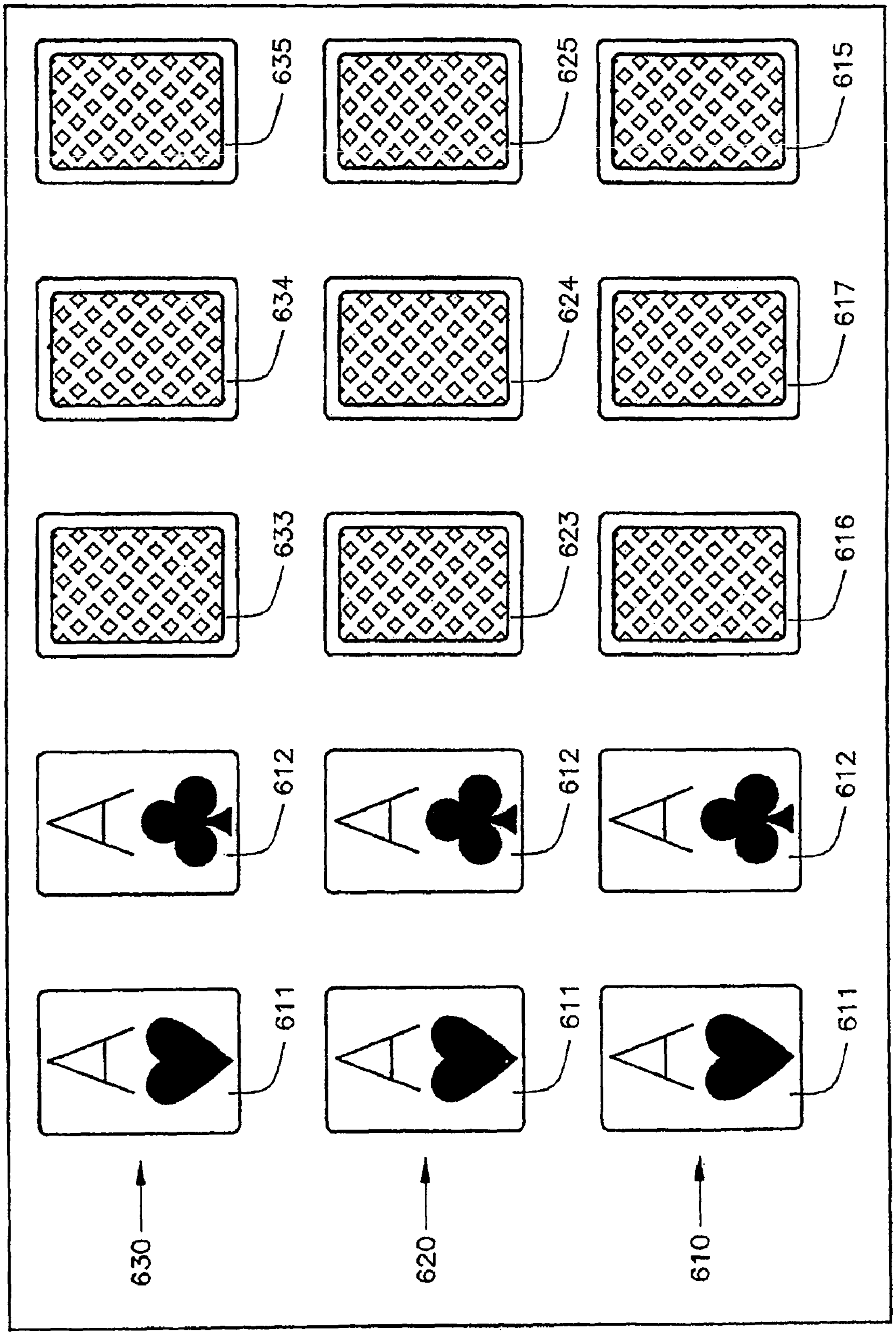
FIG. 11 shows the screen display for Version #D after the player has selected the cards he wishes to hold from first hand and these cards have been duplicated into the other two hands.

Another alternative method of play of the present invention would have two or more rows of less than a complete five card hand be dealt face up. Then after the player has selected the cards to be duplicated from the first row into the other rows, each row is completed to have five cards. In the preferred embodiment of this version #D, the player wagers on the number of hands the player wishes to play, for example the three rows shown in FIG. 10. The first hand 610 is dealt with one, two, three or four of the cards dealt face up and the remaining cards face down, such as the four face up cards and the one face down card shown in the example in FIG. 10. Hand 610 is dealt with five cards—the Ace of Hearts 611, the Ace of Spades 612, the King of Clubs 613, the Six of Spades 614 and the face down card 615. The player can then select which cards to hold from the first row 610 and these cards selected by the player are automatically duplicated in the other two rows 620 and 630. Again with reference to the example shown in FIG. 11, the player would most likely hold the Ace of Hearts 611 and the Ace of Clubs 612 as the cards to be duplicated into the other hands.

Figure 12:
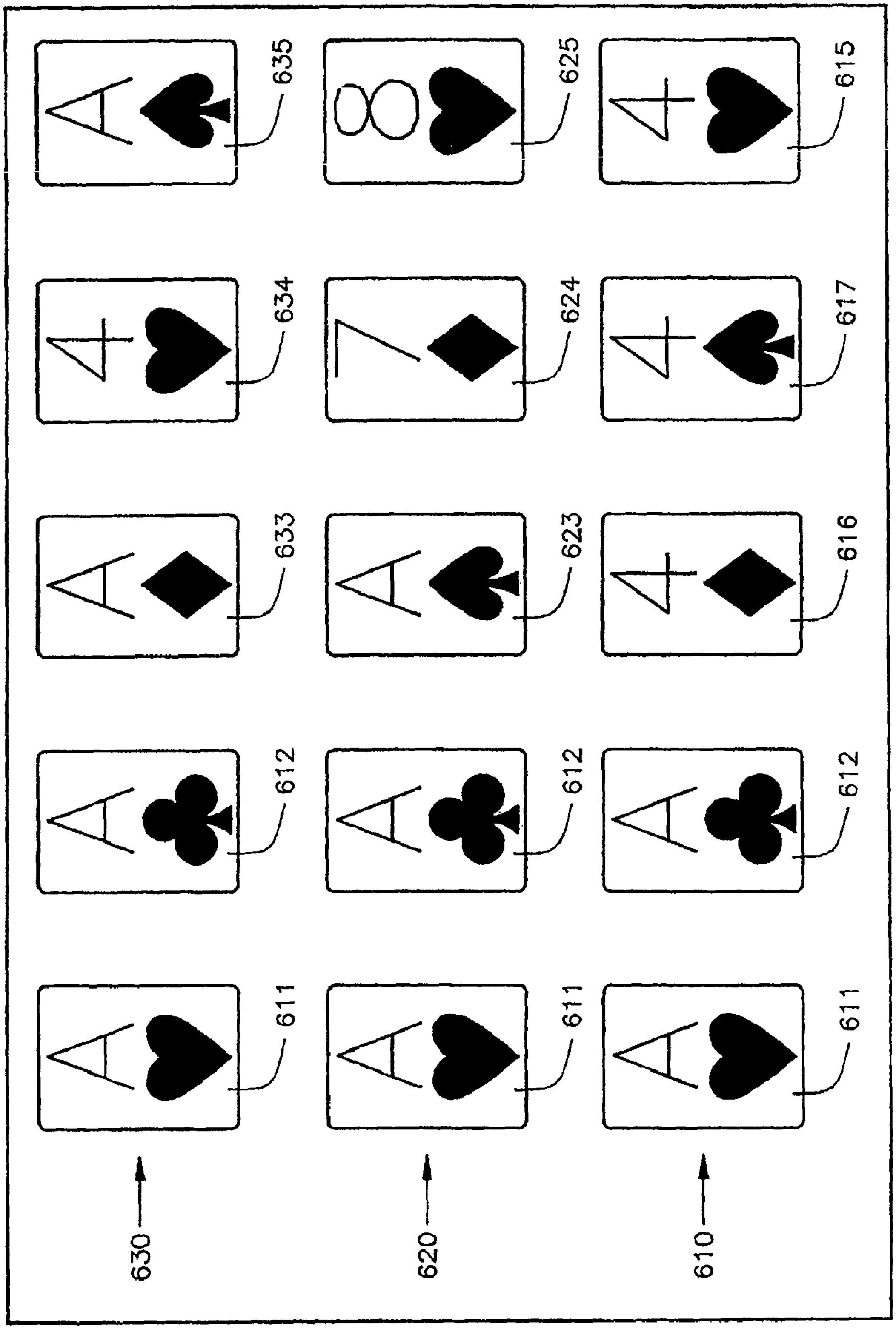
FIG. 12 shows the screen display for Version #D after all three rows have been completed and show five card hands.

The first hand 610 then receives replacement cards for the cards that are discarded and the face down card 615 is turned face up. In this example as shown in FIG. 12, the first hand has a final hand of the Ace of Hearts 611, the Ace of Clubs 612, the Four of Diamonds 616, the Four of Spades 617 and the Four of Hearts 615. The second hand and the third hand have their face down cards turned face up. The second hand 620 has a final hand of the Ace of Hearts 611, the Ace of Clubs 612, the Ace of Spades 623, the Seven of Diamonds 624 and the Eight of Hearts 625. The third hand 620 has a final hand of the Ace of Hearts 611, the Ace of Clubs 612, the Ace of Diamonds 633, the Four of Hearts 634 and the Ace of Spades 635.

The player now has three final five card hands and wins or loses on each hand separately based on a pay table which shows the winning hand combinations. If the player has a winning hand, the amount won by the player is based on the amount wagered by the player on that particular row and the poker hand ranking of the cards in that row. For example, again with reference to FIG. 12, in hand 610 the player has a Full House, in hand 620 the player has a Three-of-a-Kind and in hand 630 the player has a Four-of-a-Kind which would all most likely be winning hands based on the pay table.

This Version #D may also be applied to methods of play that use only two rows or that use four or more rows.

Version #E

In another version of the present invention, the method of play can be applied to poker-type games that use less than a five card hand. For example, three card poker and four card poker can be adapted to the present invention.

Figure 13:
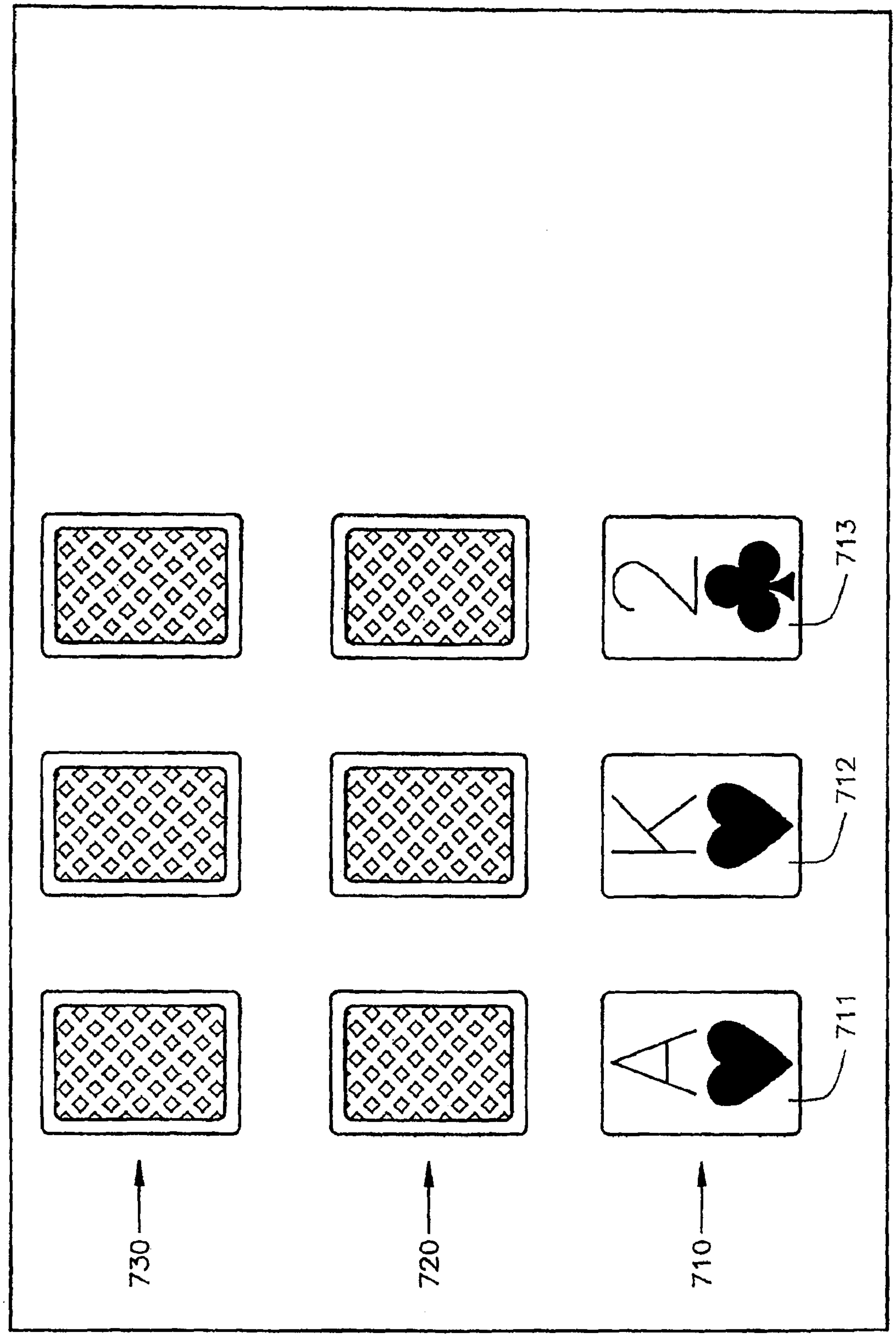
FIG. 13 shows the screen display for the three card poker Version #E of the present invention after the initial deal of the cards.
Figure 14:
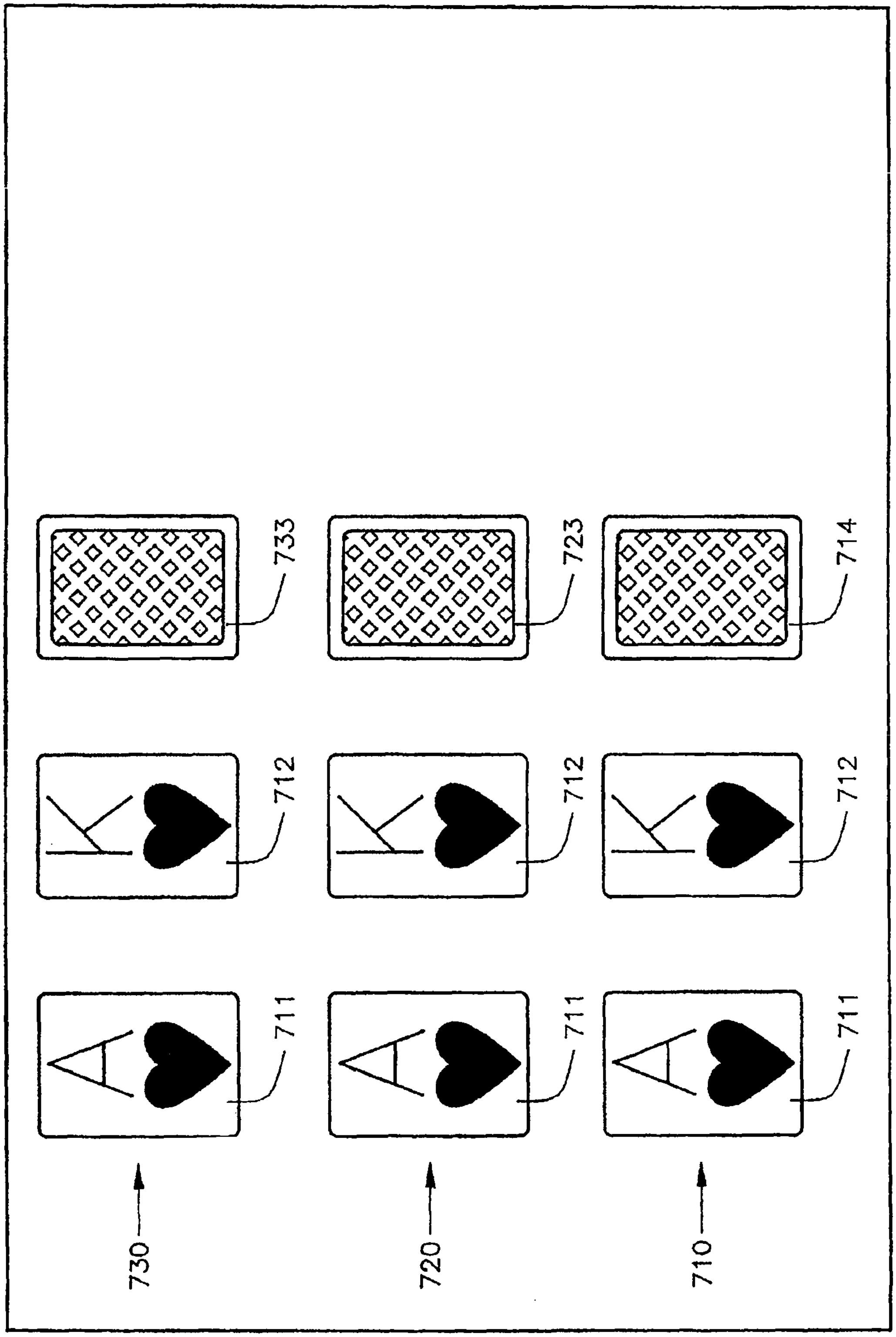
FIG. 14 shows the screen display for the three card poker Version #E after the player has selected the cards he wishes to hold from first hand and these cards have been duplicated into the other two hands.

FIG. 13 shows an initial deal of a three card poker game which allows the player to play multiple hands. In the preferred embodiment of this version #E, the player wagers on the number of hands the player wishes to play, for example the three rows shown in FIG. 13. The first hand 710 is dealt with all three cards face up. Hand 710 is dealt with the Ace of Hearts 711, the King of Hearts 712 and the Two of Clubs 713. The player can then select which cards to hold from the first row 710 and these cards selected by the player are automatically duplicated in the other two rows 720 and 730. Again with reference to the example shown in FIG. 14, the player would most likely hold the Ace of Hearts 711 and the King of Hearts 712 as the cards to be duplicated into the other hands.

Figure 15:
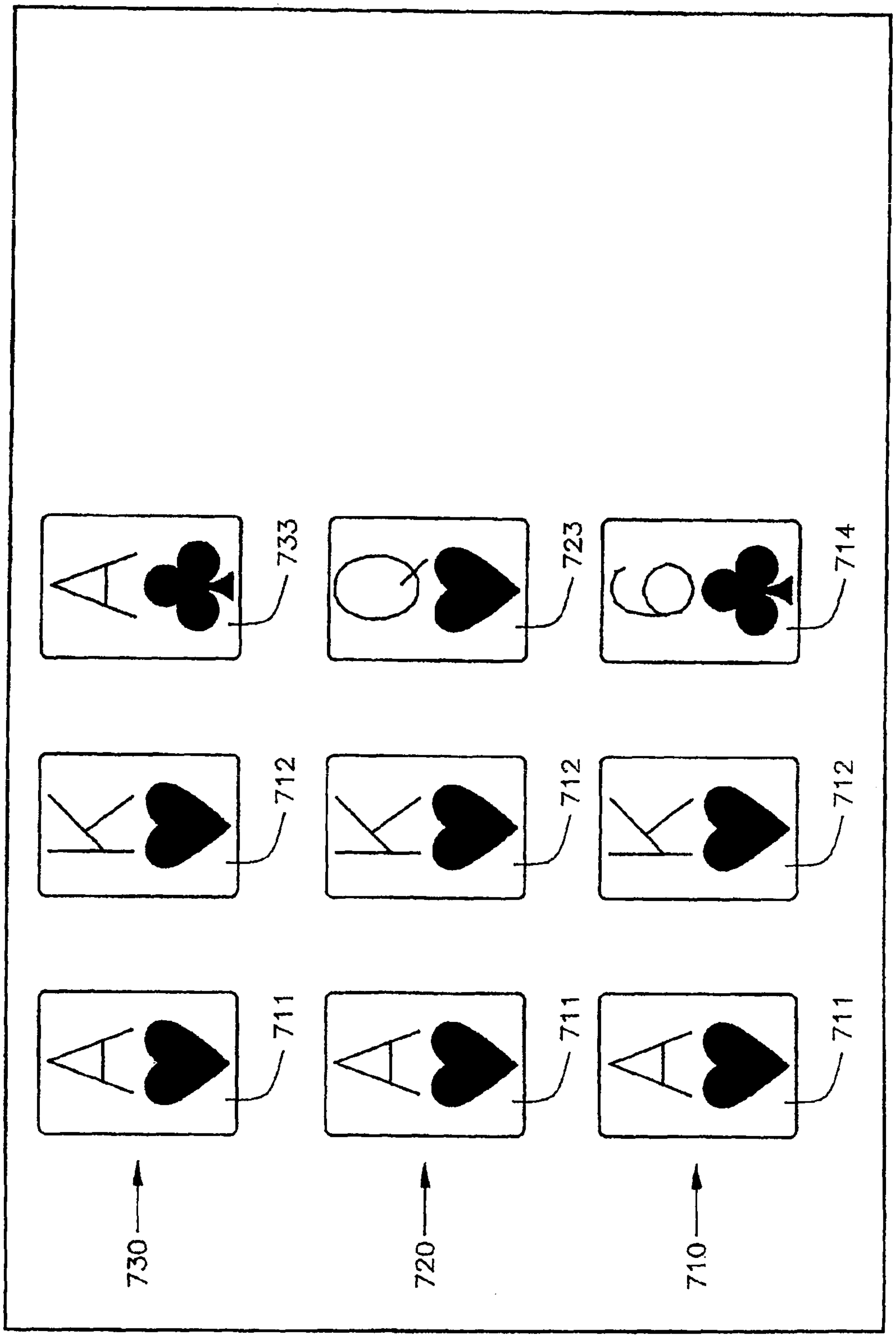
FIG. 15 shows the screen display for the three card poker Version #E after all three rows have been completed and show five card hands.

The first hand 710 then receives a replacement card for the card that is discarded. In this example as shown in FIG. 15, the first hand has a final hand of the Ace of Hearts 711, the King of Hearts 712 and the Six of Clubs 714. The second hand 720 has a final hand of the Ace of Hearts 711, the King of Hearts 712 and the Queen of Hearts 723. The third hand 730 has a final hand of the Ace of Hearts 711, the King of Hearts 712 and the Ace of Clubs 733.

The player now has three final three card hands and wins or loses on each hand separately based on a pay table which shows the winning hand combinations. If the player has a winning hand, the amount won by the player is based on the amount wagered by the player on that particular row and the poker hand ranking of the cards in that row. For example, again with reference to FIG. 15, in hand 710 the player has a three card Ace High which would probably be a losing hand based on a preferred pay table. In hand 720 the player has a three card Straight Flush and in hand 730 the player has a Pair of Aces which would all most likely be winning hands based on the preferred pay table.

Any suitable pay table may be used for this multiple hand version of a three card poker game. For illustration purposes, a representative pay table is shown in Table 1.

TABLE 1

| Poker Hand Ranking | Per Coin Wagered |
|---|---|
| Straight Flush | 25 |
| Flush | 6 |
| Straight | 5 |
| Three-of-a-Kind | 3 |
| Any Pair | 1 |

Figure 16:
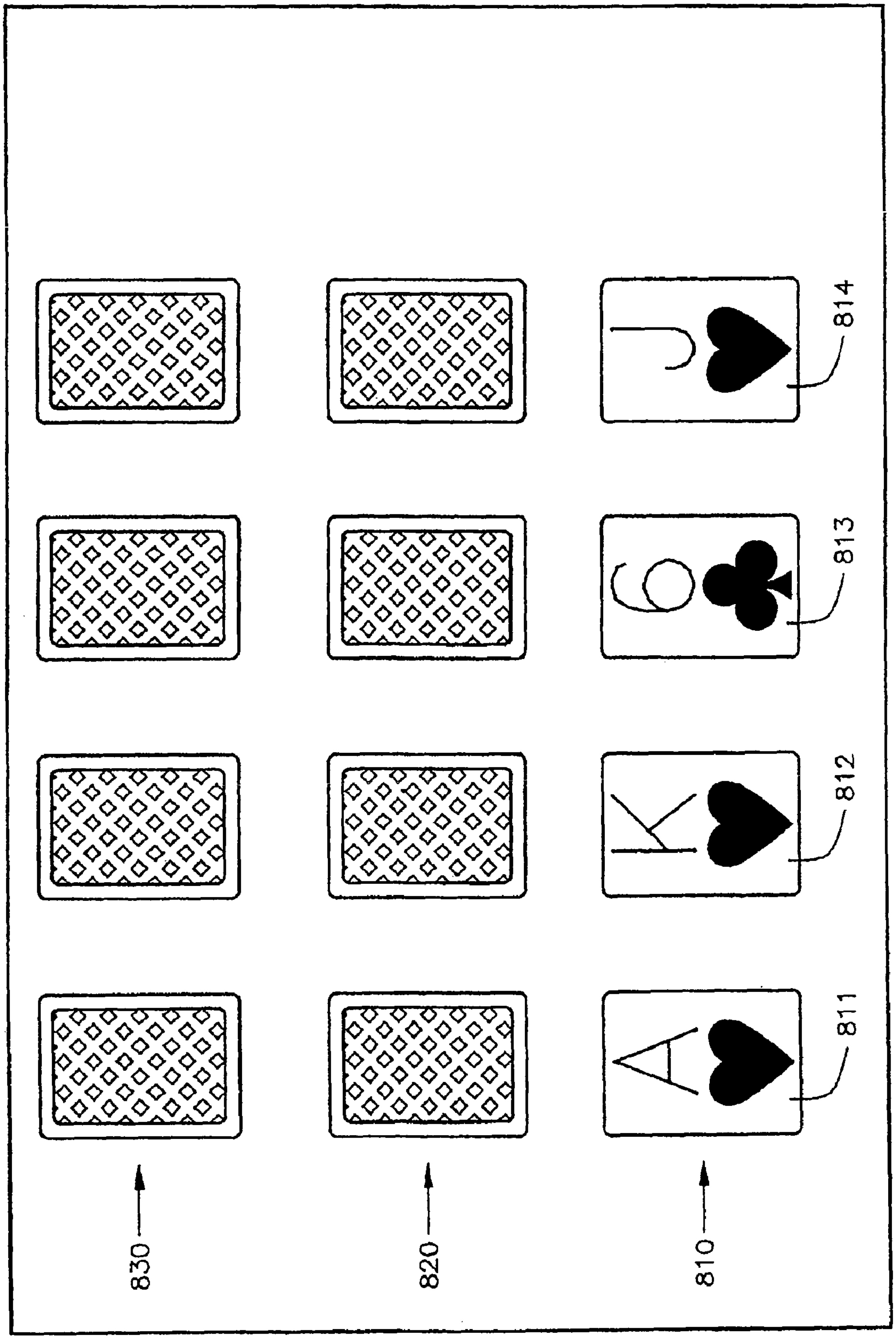
FIG. 16 shows the screen display for the four card poker Version #E of the present invention after the initial deal of the cards.
Figure 17:
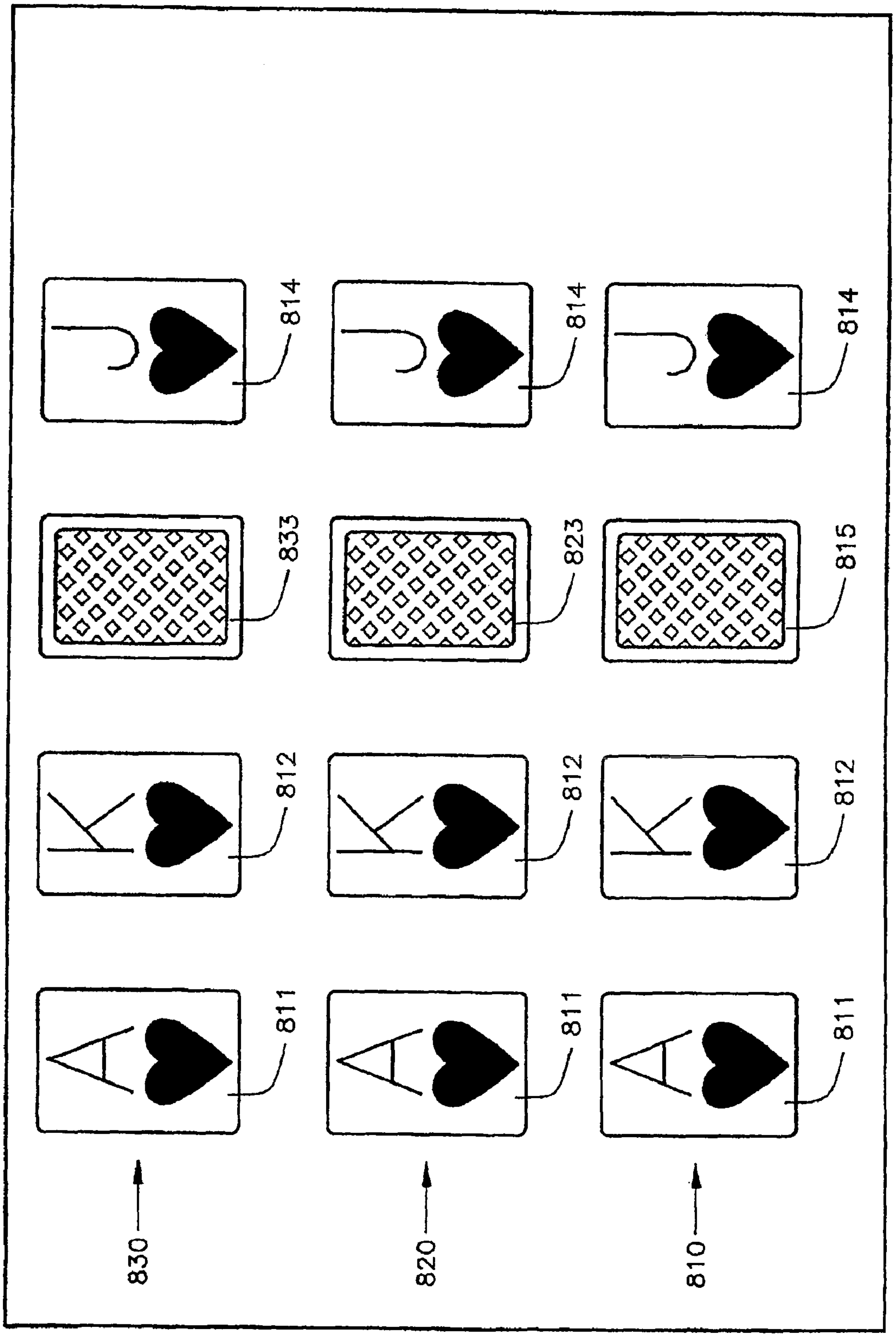
FIG. 17 shows the screen display for the four card poker Version #E after the player has selected the cards he wishes to hold from first hand and these cards have been duplicated into the other two hands.
Figure 18:
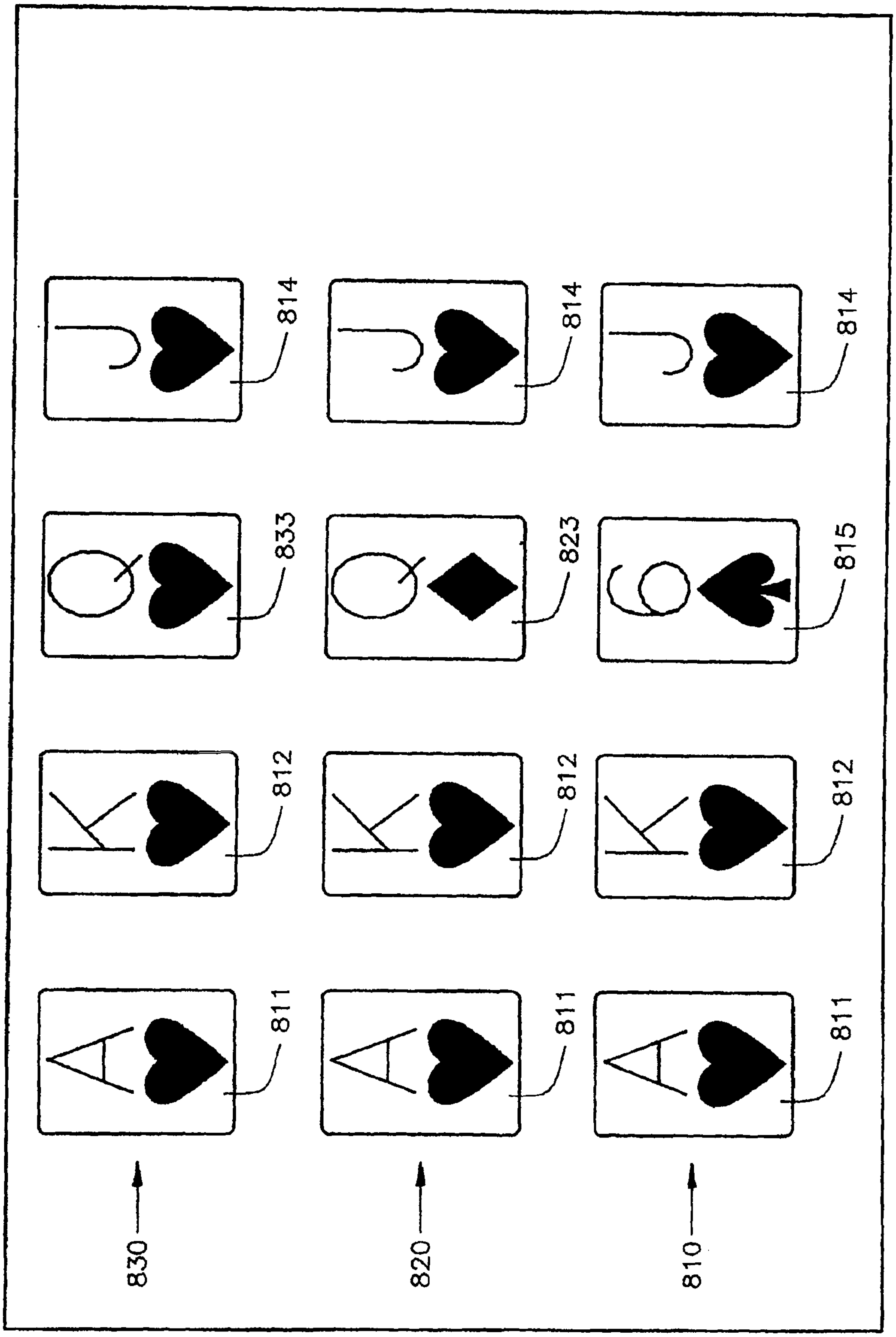
FIG. 18 shows the screen display for the four card poker Version #E after all three rows have been completed and show five card hands.

This version #E can also be applied to four card poker as shown in FIGS. 16-18. FIG. 16 shows an initial deal of a four card poker game which allows the player to play multiple hands. The player wagers on the number of hands the player wishes to play, for example the three rows shown in FIG. 16. The first hand 810 is dealt with all four cards face up. Hand 810 is dealt with the Ace of Hearts 811, the King of Hearts 812, the Six of Clubs 813 and the Jack of Hearts. The player can then select which cards to hold from the first row 810 and these cards selected by the player are automatically duplicated in the other two rows 820 and 830. Again with reference to the example shown in FIG. 17, the player would most likely hold the Ace of Hearts 811, the King of Hearts 812 and the Jack of Hearts 814 as the cards to be duplicated into the other hands.

The first hand 810 then receives a replacement card for the card that is discarded. In this example as shown in FIG. 15, the first hand 810 has a final hand of the Ace of Hearts 811, the King of Hearts 812, the Six of Spades 815 and the Jack of Hearts 814. The second hand 820 has a final hand of the Ace of Hearts 811, the King of Hearts 812, the Queen of Diamonds 823 and the Jack of Hearts 814. The third hand 830 has a final hand of the Ace of Hearts 811, the King of Hearts 812, the Queen of Hearts 813 and the Jack of Hearts 814.

The player now has three final four card hands and wins or loses on each hand separately based on a pay table which shows the winning hand combinations. If the player has a winning hand, the amount won by the player is based on the amount wagered by the player on that particular row and the poker hand ranking of the cards in that row. For example, again with reference to FIG. 18, in hand 810 the player has a four card Ace High which would probably be a losing hand based on the pay table. In hand 820 the player has a four card Straight and in hand 830 the player has a four card Straight Flush which would all most likely be winning hands based on the pay table.

Any suitable pay table may be used for this multiple hand version of a four card poker game. For illustration purposes, a representative pay table is shown in Table 2.

TABLE 2

| Poker Hand Ranking | Per Coin Wagered |
|---|---|
| Straight Flush | 100 |
| Four-of-a-Kind | 50 |
| Flush | 6 |
| Straight | 5 |
| Three-of-a-Kind | 3 |
| Two Pair | 2 |
| Any Pair | 1 |

This Version #E may also be applied to methods of play that use only two rows or that use four or more rows.

In addition to three, four or five card rows, the method of the present invention can also be applied to six, seven or more card rows. Winning hand combinations can be based on six card poker hand, seven card poker hands or even more card poker hands. Alternatively, the winning hand combinations can be based on the best five card poker hand out of the six, seven or even more cards in the row.

Alternatively, the method of play of any of the embodiments of the present invention can also use only one standard fifty-two card deck. In this alternative, each of the player's hands will receive different replacement cards from the single deck for those cards that are discarded. For example with reference to FIG. 3, if a player holds less than five cards from the top row 410, each hand will receive different replacement cards so that player has the possibility of achieving various winning combinations.

In either the multiple deck embodiment or the single deck embodiment, one or more cards may alternatively be designated as wild cards or one or more Jokers may be added to the deck or decks and designated as wild cards. This allows the methods of the present invention to be applied to any of the various wild card video poker games that are known in the art, such as Deuces Wild or Joker's Wild.

Special bonus payouts can be added if the player achieves, either on the deal or after the draw, three hands of the same rank at the same time. These bonus payouts could be fixed amounts or progressive payouts. For example, the player could win a progressive payout for achieving three Full Houses at the same time. As another example when three decks are used, the player can receive a large fixed or progressive payout if the player achieves the same poker hand in each of the three rows—such as a Royal Flush in Spades in all three rows.

The various embodiments of the present invention have been described in connection with a video display screen similar to conventional video poker in which each hand of cards is shown horizontally across the display screen. It is also possible to display the cards in other suitable formats. For example, a video slot machine reel format can be used in which the cards appear to spin in a vertical plane on the video display screen. The player would initiate the simulated spinning of reels after the player has made his wager on the number of pay lines which the player wishes to play. Each pay line would be the equivalent of a separate hand of cards.

When the reels stop spinning, a first hand of cards would be displayed on the video screen display along a first pay line. The player would select which of the initial cards from this first hand that the player wishes to hold. The held cards would be duplicated into the other pay lines upon which the player has wagered.

After the cards have been duplicated into the other pay lines, the player would activate a "DRAW" button which would cause the vertical columns that still need cards to simulate a spinning mode. When these columns stop spinning, each pay line would then have a complete poker hand. Each pay line is then analyzed to determine the poker hand ranking of the pay line and winning and losing card combinations are then determined. The award to the player is based on any winning combination on a pay line and the amount wagered by the player as shown in a pay table. One advantage of using spinning reel representations of the cards in each hand is that the pay lines do not have to be horizontal rows. The pay lines may also be diagonal lines or even W-shaped or M-shaped pay lines such as are used in other conventional slot machines having video reels.

While the various methods of play of the present invention have been described in the context of electronic video gaming machines, each method of play can also be carried on a live gaming table using a live dealer with the players arranged around the gaming table, in the manner in which other live table games such a Twenty-One or card room poker is conducted.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

The invention is claimed as follows:

1. A video poker machine comprising:

a display device;

at least one input device; and a computer, wherein said computer is configured with the display device and the at least one input device to, for a single play of a card game:

(a) enable a player to make a first wager, (b) enable the same player to make a second wager, (c) after the same player makes the first wager and the second wager, cause the display device to display to the same player:

(i) a plurality of first cards face up in association with the first wager, and (ii) a plurality of second cards face up in association with the second wager, the plurality of second cards and the plurality of first cards being the same plurality of cards, (d) after receiving an input by the same player, cause the display device to display to the same player:

(i) a card face up in association with the first wager, and (ii) a same card face up in association with the second wager, (e) cause the display device to display to the same player:

(i) two more cards face up in association with the first wager, and (ii) two more cards face up in association with the second wager, which may be different than said two more cards associated with the first wager, (f) determine a poker ranking of the cards associated with the first wager, (g) determine a poker ranking of the cards associated with the second wager, (h) pay the same player a pre-established amount based on the amount of the first wager and the poker ranking of the cards associated with the first wager if said cards comprise a predetermined poker hand ranking, and (i) pay the same player a pre-established amount based on the amount of the second wager and the poker ranking of the cards associated with the second wager if said cards comprise a predetermined poker hand ranking.

2. The video poker machine of claim 1, wherein separate decks of cards are used to determine the two more cards in association with the first wager and the two more cards in association with the second wager.

3. A video poker machine comprising:

a display device;

at least one input device; and a computer, wherein said computer is configured with the display device and the at least one input device to, for a single play of a card game:

(a) enable a player to make a plurality of wagers, (b) after the same player makes the plurality of wagers, cause the display device to display to the same player, for each wager, a plurality of same cards face up associated with said wager, (c) after receiving an input by the same player, cause the display device to display to the same player, for each wager, a same card face up in association with said wager, (d) cause the display device to display to the same player, for each wager, two more cards face up in association with said wager, wherein for each wager the two more cards associated with each wager may be different, (e) for each wager, determine a poker ranking of the cards associated with said wager, and (f) for each wager, pay the same player a pre-established amount based on the amount of said wager and the poker ranking of the cards associated with said wager if said cards comprise a predetermined poker hand ranking.

4. The video poker machine of claim 3, wherein separate decks of cards are used to determine the two more cards in association with each wager.

5. A video poker machine comprising:

a display device;

at least one input device; and a computer, wherein the computer is configured with the display device and the at least one input device, for a single play of a card game, to:

(a) cause the display device to display a first hand of five cards face up to a player, (b) enable none, one or more than one of the face up cards from the first hand to be held by the same player, (c) display to the same player each held card from the first hand in each of a plurality of additional hands, (d) complete each additional hand such that each additional hand has five displayed cards, and (e) determine the poker hand ranking of the cards of each additional hand.

6. The video poker machine of claim 5, wherein the computer is configured with the display device to display for each hand, a pre-established amount based at least in part on the poker ranking of the cards of said hand if said cards comprise a predetermined poker hand ranking.

7. The video poker machine of claim 5, wherein separate decks of cards are used to complete each additional hand.

8. A method of operating a video poker machine, said method for a single play of a card game comprising:

(a) enabling a player to make a first wager;

(b) enabling the same player to make a second wager;

(c) after the same player makes the first wager and the second wager, causing one display device to display to the same player:

(i) a plurality of first cards face up in association with the first wager, and (ii) a plurality of second cards face up in association with the second wager, the plurality of second cards and the plurality of first cards being the same plurality of cards;

(d) after receiving an input by the same player, causing the one display device to display to the same player:

(i) a card face up in association with the first wager, and (ii) a same card face up in association with the second wager;

(e) causing the one display device to display to the same player:

(i) two more cards face up in association with the first wager, and (ii) two more cards face up in association with the second wager, which may be different than said two more cards associated with the first wager;

(f) causing a computer to determine a poker ranking of the cards associated with the first wager;

(g) causing the computer to determine a poker ranking of the cards associated with the second wager;

(h) paying the same player a pre-established amount based on the amount of the first wager and the poker ranking of the cards associated with the first wager if said cards comprise a predetermined poker hand ranking; and (i) paying the same player a pre-established amount based on the amount of the second wager and the poker ranking of the cards associated with the second wager if said cards comprise a predetermined poker hand ranking.

9. The method of operating a video poker machine of claim 8, which includes using separate decks of cards to determine the two more cards in association with the first wager and the two more cards in association with the second wager.

10. A method of operating a video poker machine, said method for a single play of a card game comprising:

(a) enabling a player to make a plurality of wagers;

(b) after the same player makes the plurality of wagers, causing one display device to display to the same player, for each wager, a plurality of same cards face up associated with said wager;

(c) after receiving an input by the same player, causing the one display device to display to the same player, for each wager, a same card face up in association with said wager;

(d) causing the one display device to display to the same player, for each wager, two more cards face up in association with said wager, wherein for each wager the two more cards associated with each wager may be different;

(e) for each wager, causing a computer to determine a poker ranking of the cards associated with said wager; and (f) for each wager, paying the same player a pre-established amount based on the amount of said wager and the poker ranking of the cards associated with said wager if said cards comprise a predetermined poker hand ranking.

11. The method of operating a video poker machine of claim 10, which includes using separate decks of cards to determine the two more cards in association with each wager.

12. A method of operating a video poker machine, said method for a single play of a card game comprising:

(a) causing one display device to display a first hand of five cards face up to a player;

(b) enabling none, one or more than one of the face up cards from the first hand to be held by the same player;

(c) displaying to the same player each held card from the first hand in each of a plurality of additional hands;

(d) completing each additional hand such that each additional hand has five displayed cards; and (e) causing a computer to determine the poker hand ranking of the cards of each additional hand.

13. The method of operating a video poker machine of claim 12, which includes for each hand, displaying a pre-established amount based at least in part on the poker ranking of the cards of said hand if said cards comprise a predetermined poker hand ranking.

14. The method of operating a video poker machine of claim 12, which includes using separate decks of cards to complete each additional hand.

15. A video poker machine comprising:

a display device;

at least one input device; and a computer, wherein said computer is configured with the display device and the at least one input device to, for a single play of a card game:

(a) enable a player to make a first wager, (b) enable the same player to make a second wager, (c) after the same player makes the first wager and the second wager, cause the display device to display to the same player a plurality of first cards face up in association with the first wager, (d) after receiving an input by the same player, cause the display device to display to the same player:

(i) a plurality of second cards face up in association with the second wager, the plurality of second cards and the plurality of first cards being the same plurality of cards, (ii) a card face up in association with the first wager, and (iii) a same card face up in association with the second wager, (e) cause the display device to display to the same player:

(i) two more cards face up in association with the first wager, and (ii) two more cards face up in association with the second wager, which may be different than said two more cards associated with the first wager, (f) determine a poker ranking of the cards associated with the first wager, (g) determine a poker ranking of the cards associated with the second wager, (h) pay the same player a pre-established amount based on the amount of the first wager and the poker ranking of the cards associated with the first wager if said cards comprise a predetermined poker hand ranking, and (i) pay the same player a pre-established amount based on the amount of the second wager and the poker ranking of the cards associated with the second wager if said cards comprise a predetermined poker hand ranking.

16. The video poker machine of claim 15, wherein separate decks of cards are used to determine the two more cards in association with the first wager and the two more cards in association with the second wager.

17. A video poker machine comprising:

a display device;

at least one input device; and a computer, wherein the computer is configured with the display device and the at least one input device, for a single play of a card game, to:

(a) cause the display device to display a first hand of a plurality of cards face up to a player, (b) enable none, one or more than one of the face up cards from the first hand to be held by the same player, (c) display to the same player each held card from the first hand in each of a plurality of additional hands, (d) complete each additional hand such that each additional hand has a predetermined quantity of displayed cards, and (e) determine the poker hand ranking of the cards of each additional hand.

18. The video poker machine of claim 17, wherein the computer is configured with the display device to display for each hand, a pre-established amount based at least in part on the poker ranking of the cards of said hand if said cards comprise a predetermined poker hand ranking.

19. The video poker machine of claim 17, wherein separate decks of cards are used to complete each additional hand.

20. A method of operating a video poker machine, said method for a single play of a card game comprising:

(a) enabling a player to make a first wager;

(b) enabling the same player to make a second wager;

(c) after the same player makes the first wager and the second wager, causing one display device to display to the same player a plurality of first cards face up in association with the first wager;

(d) after receiving an input by the same player, causing the one display device to display to the same player:

(i) a plurality of second cards face up in association with the second wager, the plurality of second cards and the plurality of first cards being the same plurality of card, (ii) a card face up in association with the first wager, and (iii) a same card face up in association with the second wager;

(e) causing the one display device to display to the same player:

(i) two more cards face up in association with the first wager, and (ii) two more cards face up in association with the second wager, which may be different than said two more cards associated with the first wager;

(f) causing a computer to determine a poker ranking of the cards associated with the first wager;

(g) causing the computer to determine a poker ranking of the cards associated with the second wager;

(h) paying the same player a pre-established amount based on the amount of the first wager and the poker ranking of the cards associated with the first wager if said cards comprise a predetermined poker hand ranking; and (i) paying the same player a pre-established amount based on the amount of the second wager and the poker ranking of the cards associated with the second wager if said cards comprise a predetermined poker hand ranking.

21. The method of operating a video poker machine of claim 20, which includes using separate decks of cards to determine the two more cards in association with the first wager and the two more cards in association with the second wager.

22. A method of operating a video poker machine, said method for a single play of a card game comprising:

(a) causing one display device to display a first hand of a plurality of cards face up to a player;

(b) enabling none, one or more than one of the face up cards from the first hand to be held by the same player;

(c) displaying to the same player each held card from the first hand in each of a plurality of additional hands;

(d) completing each additional hand such that each additional hand has a plurality of displayed cards; and (e) causing a computer to determine the poker hand ranking of the cards of each additional hand.

23. The method of operating a video poker machine of claim 22, which includes for each hand, displaying a pre-established amount based at least in part on the poker ranking of the cards of said hand if said cards comprise a predetermined poker hand ranking.

24. The method of operating a video poker machine of claim 22, which includes using separate decks of cards to complete each additional hand.

* * * * *

UNITED STATES PATENT AND TRADEMARK OFFICE

CERTIFICATE OF CORRECTION

PATENT NO. : 8,235,781 B2
APPLICATION NO. : 12/202815
DATED : August 7, 2012
INVENTOR(S) : Ernest W. Moody It is certified that error appears in the above-identified patent and that said Letters Patent is hereby corrected as shown below:

IN THE CLAIMS

In Claim 1, Column 11, Line 26, replace the first instance of "the" with --an--.
In Claim 1, Column 11, Line 30, replace the first instance of "the" with --an--.
In Claim 3, Column 11, Line 55, replace "each" with --said--.
In Claim 3, Column 11, Line 59, replace the first instance of "the" with --an--.
In Claim 5, Column 12, Line 13, replace the first instance of "the" with --an--.
In Claim 6, Column 12, Line 18, between "poker" and "ranking" insert --hand--.
In Claim 8, Column 12, Line 48, replace "the amount" with --an amount--.
In Claim 8, Column 12, Line 54, replace "the amount" with --an amount--.
In Claim 10, Column 13, at about Line 12, replace "each" with --said--.
In Claim 10, Column 13, Line 18, replace "the amount" with --an amount--.
In Claim 12, Column 13, Line 34, replace "the" with --a--.
In Claim 13, Column 13, Line 38, between "poker" and "ranking" insert --hand--.
In Claim 15, Column 14, at about Line 9, replace "the amount" with --an amount--.
In Claim 15, Column 14, at about Line 14, replace "the amount" with --an amount--.
In Claim 17, Column 14, Line 36, replace "the poker" with --a poker--.
In Claim 18, Column 14, Line 41, between "poker" and "ranking" insert --hand--.
In Claim 20, Column 14, Line 57, replace "card" with --cards--.
In Claim 20, Column 15, Line 6, replace "the amount" with --an amount--.
In Claim 20, Column 15, at about Line 10, replace "the amount" with --an amount--.
In Claim 22, Column 16, Line 9, replace "the poker" with --a poker--.

Signed and Sealed this
Fifth Day of February, 2013

Teresa Stanek Rea
*Acting Director of the United States Patent and Trademark Office*